(12) United States Patent
Holbrook et al.

(10) Patent No.: US 11,414,851 B1
(45) Date of Patent: Aug. 16, 2022

(54) LEACHING CHAMBER HAVING A SIDEWALL WITH LOUVERS

(71) Applicant: INFILTRATOR WATER TECHNOLOGIES, LLC, Old Saybrook, CT (US)

(72) Inventors: Paul R. Holbrook, Old Saybrook, CT (US); Bryan A. Coppes, Old Saybrook, CT (US); Adam Sky Miller, Killingworth, CT (US)

(73) Assignee: Infiltrator Water Technologies, LLC, Old Saybrook, CT (US)

( * ) Notice: Subject to any disclaimer, the term of this patent is extended or adjusted under 35 U.S.C. 154(b) by 0 days.

(21) Appl. No.: 16/676,307

(22) Filed: Nov. 6, 2019

Related U.S. Application Data

(63) Continuation-in-part of application No. 15/805,256, filed on Nov. 7, 2017, now abandoned.

(51) Int. Cl.
*E03F 1/00* (2006.01)
*B29K 67/00* (2006.01)
*B29C 51/14* (2006.01)
*B29C 51/00* (2006.01)

(52) U.S. Cl.
CPC ............ *E03F 1/003* (2013.01); *B29C 51/002* (2013.01); *B29C 51/14* (2013.01); *B29K 2067/003* (2013.01)

(58) Field of Classification Search
CPC ..................................................... E03F 1/003
See application file for complete search history.

(56) References Cited

U.S. PATENT DOCUMENTS

| | | | | |
|---|---|---|---|---|
| 3,834,824 | A * | 9/1974 | Jahn ........................ | B42F 13/02 402/13 |
| 7,364,384 | B1 * | 4/2008 | Swistak .................. | E03F 1/003 405/43 |
| 9,045,873 | B1 * | 6/2015 | Moore, Jr. .............. | E03F 1/003 |
| 2005/0074285 | A1 * | 4/2005 | Burnes .................... | E03F 1/003 405/43 |
| 2007/0258770 | A1 * | 11/2007 | Miskovich .............. | E03F 1/003 405/43 |

* cited by examiner

*Primary Examiner* — Janine M Kreck
(74) *Attorney, Agent, or Firm* — Steven M. McHugh

(57) ABSTRACT

A plastic leaching chamber is provided and includes a chamber substrate constructed from a PET material and having opposing side base flanges which lie in a horizontal plane and extend lengthwise along the chamber substrate. The chamber substrate includes opposing sidewalls extending upwardly from each of the opposing side base flanges to a top of the chamber substrate and includes a lengthwise center plane which is perpendicular to the horizontal plane. The opposing sidewalls define a plurality of leaching openings having at least one tab slot opening located proximate thereto, and a plurality of louver articles constructed from at least one of a PE and a PP material. Each of the louver articles include a tab which is configured to engage a tab slot opening to securely associate the plurality of louver articles with the chamber substrate to cover the at least one leach opening.

19 Claims, 46 Drawing Sheets

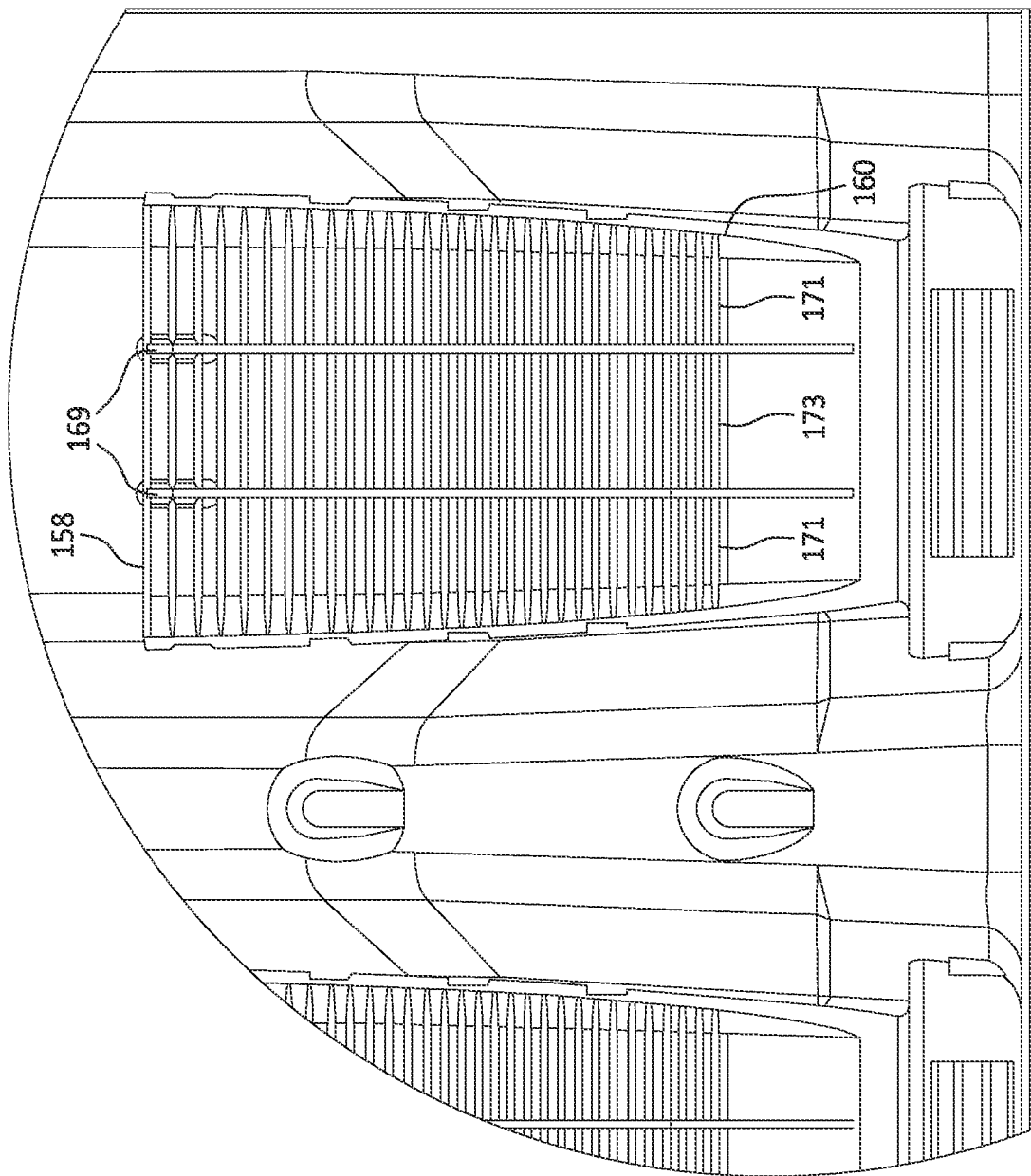

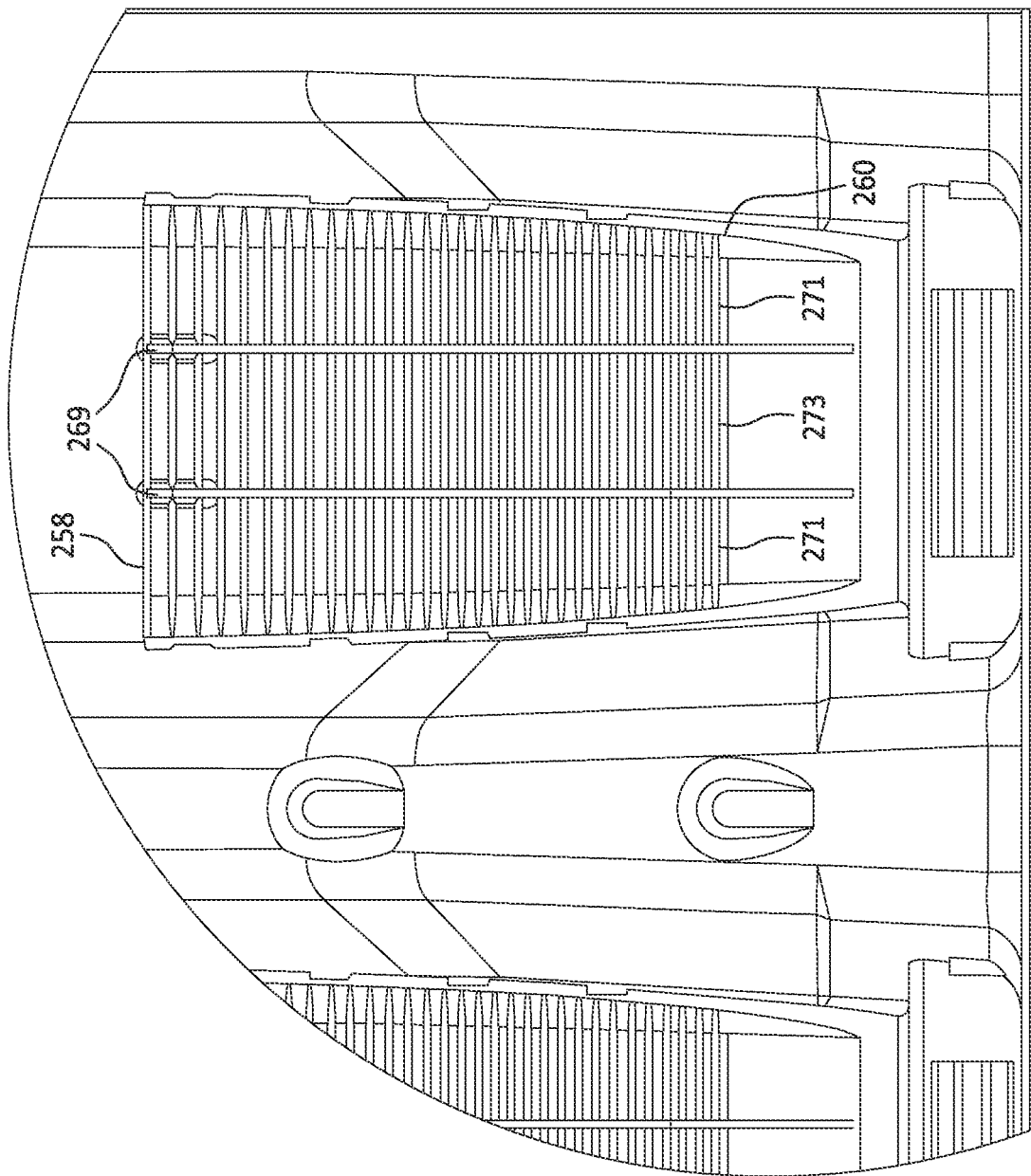

Section B-B

LEACHING CHAMBER HAVING A SIDEWALL WITH LOUVERS

FIELD OF THE INVENTION

This application is a continuation-in-part application, and claims the benefit of priority of the filing date, of U.S. patent application Ser. No. 15/805,256, filed Nov. 17, 2017 which claims the benefit of U.S. patent application Ser. No. 14/839,460 (now U.S. Pat. No. 9,809,968) filed Aug. 28, 2015, the contents of both of which are incorporated herein by reference in their entireties.

FIELD OF THE INVENTION

The present invention relates generally to a plastic chamber suitable for burial within soil, and more particularly to a plastic leaching chamber having an arch shaped cross section with louvers in the sidewall for receiving and dispersing liquids for wastewater disposal systems.

BACKGROUND OF THE INVENTION

Thermoplastic materials, such as Polyethylene (PE) and Polypropylene (PP), are well known and are used to create many different types of products for many different types of uses. One particular type of thermoplastic, Polyethylene terephthalate, or PET, is the most common type of thermoplastic polymer resin of the polyester family. This type of thermoplastic is widely used to make many types of products, such as plastic containers for liquids and foods and as polyester fibers for clothing, just to name a few. In some applications PET provides for a structurally stronger product and because PET has special properties that make it chemically non-reactive to carbonated beverages, PET is widely used for bottles for containing beverages. In fact, in 2016 it was estimated that approximately 56 million tons of PET are produced each year. Unfortunately, the time it takes for thermoplastics, such as PET, to degrade can range from decades to hundreds of years. As such, it is beneficial to society and, thus desirable, to recycle.

Referring to FIG. 1, leaching chambers constructed from Polyethylene (PE) or Polypropylene (PP) have been made by methods which include thermoforming of sheet material and injection molding. And while the cost of molds and molding equipment has long been a disadvantage of injection molding, injection molding has been popular because it provides for more precise wall thicknesses as compared to thermoforming and does not require a secondary operation to make the sidewall perforations. Generally, these chambers store substantial quantities of wastewater within their concave interior cavity, and thus provide a leaching area for dispersal of the wastewater by means of the chamber open bottom and perforations in the sidewalls. In fact, one of the performance objectives of the chambers is to provide an interior cavity that is large in order to contain as much wastewater as possible. The larger the interior cavity of the chamber is, the more wastewater that can be stored and dispersed into the surrounding soil.

A thermoformed leaching chamber made of Polyethylene (PE) or Polypropylene (PP) might have a wall thickness which varies between 0.08 inches and 0.16 inches and include cut hole perforations in the sidewalls. To use such chambers in common and sandy soil, the chambers typically have to be covered with geotextile to prevent the migration of soil through the sidewall holes and into the interior portion of the chamber. In comparison, injection molded chambers typically include sidewall slots with associated louvers and present less of a need for the use of geotextile because the angle of the louvers present a more advantageous exposure of the soil at the slot openings in the sidewall of the chamber. As such, during use while the leaching chambers are buried in soil, the louvers act to inhibit and/or limit the tendency of the surrounding soil from entering the chamber interior via the sidewall slot openings. Keeping the surrounding soil from entering the chamber interior is desirable because the more soil that enters the interior cavity of the chamber, the more the volume of the interior cavity of the chamber is reduced, thereby reducing the amount of wastewater that the chamber can contain and disperse. Generally, the slots are defined vertically by spaced apart horizontal louvers which canopy the slots and which typically have smooth underside and topside surfaces.

In light of the above, it is desirable to use recycled and virgin PET in some products that would otherwise traditionally be made from Polyethylene (PE) or Polypropylene (PP). For example, chambers made from recycled and/or virgin PET material have better structural and mechanical properties, such as greater impact resistance, than chambers made from other common plastics used to make leaching chambers, such as Polyethylene (PE) or Polypropylene (PP). And due to the variances in supply and cost amongst recycled plastic raw materials, it is more cost effective to use PET materials for structural items, such as molded plastic leaching chambers and storm chambers over Polyethylene (PE) or Polypropylene (PP).

Unfortunately, a couple of problems currently exist with the use of PET materials. One such problem is that, in general, the properties of recycled thermoplastics tend to be inferior to virgin materials. Nevertheless, it remains desirable to make products, in particular leaching chambers and other arch shaped cross section chambers having perforated sidewalls, from recycled and/or virgin PET material. Another such problem is that injection molding with recycled PET presents issues in the molding process, particularly with respect to flowing the PET material and filling the small channels of an injection molding mold. Thus, forming perforated sidewalls via injection molding of PET material is extremely difficult and thus far is not achievable to an acceptable degree.

SUMMARY OF THE INVENTION

A corrugated plastic leaching chamber having an arch-shaped cross section is provided and includes opposing side base flanges which lie in a horizontal plane and extend lengthwise along the chamber and opposing sidewalls extending upwardly from each of the opposing side base flanges to a top of the chamber. The chamber includes a lengthwise center plane which is perpendicular to the horizontal plane. The chamber further includes a chamber substrate constructed from a Polyethylene terephthalate (PET) material and having, a plurality of peak corrugations running transverse to the length of the chamber, wherein each of the plurality of peak corrugations includes a peak top, a plurality of valley corrugations running transverse to the length of the chamber, wherein each of the plurality of valley corrugations includes a valley bottom, wherein each of the peak tops are connected with an adjacent valley bottom via an arch-curving sidewall, wherein each of the plurality of peak corrugations are located adjacent at least one of the plurality of valley corrugations such that the plurality of peak corrugations and the plurality of valley corrugations are alternating along the length of the chamber, and wherein a plurality of at least one of the valley bottoms and valley tops define a leach opening, and a plurality of louver articles, wherein each of the plurality of louver articles are securely associated with the chamber to cover at least one leach opening.

A corrugated plastic leaching chamber is provided and includes a chamber substrate constructed from a Polyethylene terephthalate (PET) material and having opposing side base flanges which lie in a horizontal plane and extend lengthwise along the chamber substrate, wherein the chamber substrate includes opposing sidewalls extending upwardly from each of the opposing side base flanges to a top of the chamber substrate, wherein the chamber substrate includes a lengthwise center plane which is perpendicular to the horizontal plane, and wherein the opposing sidewalls define a plurality of leaching openings having at least one tab slot opening located proximate thereto, and a plurality of louver articles constructed from at least one of a Polyethylene (PE) and a Polypropylene (PP) material, wherein each of the plurality of louver articles include at least one tab which is configured to engage with the at least one tab slot opening to securely associate the plurality of louver articles with the chamber substrate to cover the at least one leach opening.

A method of forming a corrugated plastic leaching chamber having an arch-shaped cross section is provided, wherein the chamber includes opposing side base flanges which lie in a horizontal plane and extend lengthwise along the chamber and opposing sidewalls extending upwardly from each of the opposing side base flanges to a top of the chamber, wherein the chamber includes a lengthwise center plane which is perpendicular to the horizontal plane. The method includes thermoforming a chamber substrate out of a Polyethylene terephthalate (PET) material using a first molding process effectuated using a first mold and a first cavity. The method further includes thermoforming a louver article out of a plastic material, using a second molding process effectuated using a second cavity, wherein if the louver article is over-molded with the chamber substrate, thermoforming a louver article includes using the first mold with the second cavity.

BRIEF DESCRIPTION OF THE DRAWINGS

The foregoing and other features and advantages of the present invention should be more fully understood from the accompanying detailed description of illustrative embodiments taken in conjunction with the following Figures in which like elements are numbered alike in the several Figures:

FIG. 10C is a side view of a section of the leaching chamber of FIG. 2 showing a louver article of FIG. 7 associated with the valley of the leaching chamber, in accordance with one embodiment of the invention.

FIG. 20C is a side view of a section of the leaching chamber of FIG. 12A showing a louver article of FIG. 17 associated with the valley of the leaching chamber, in accordance with one embodiment of the invention.

DETAILED DESCRIPTION

Figure 1:
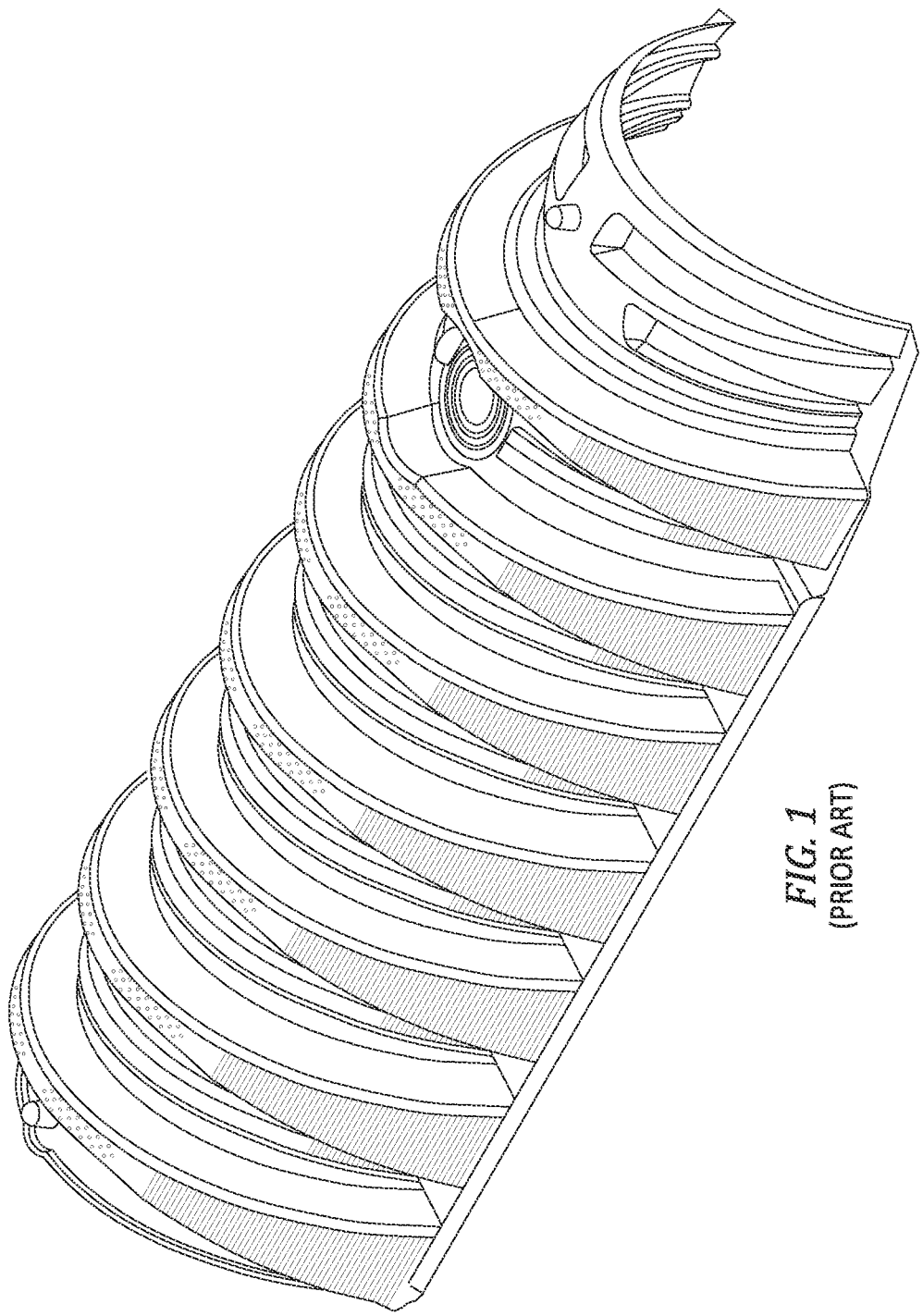
FIG. 1 front side view of a leaching chamber, in accordance with the prior art.
Figure 2:
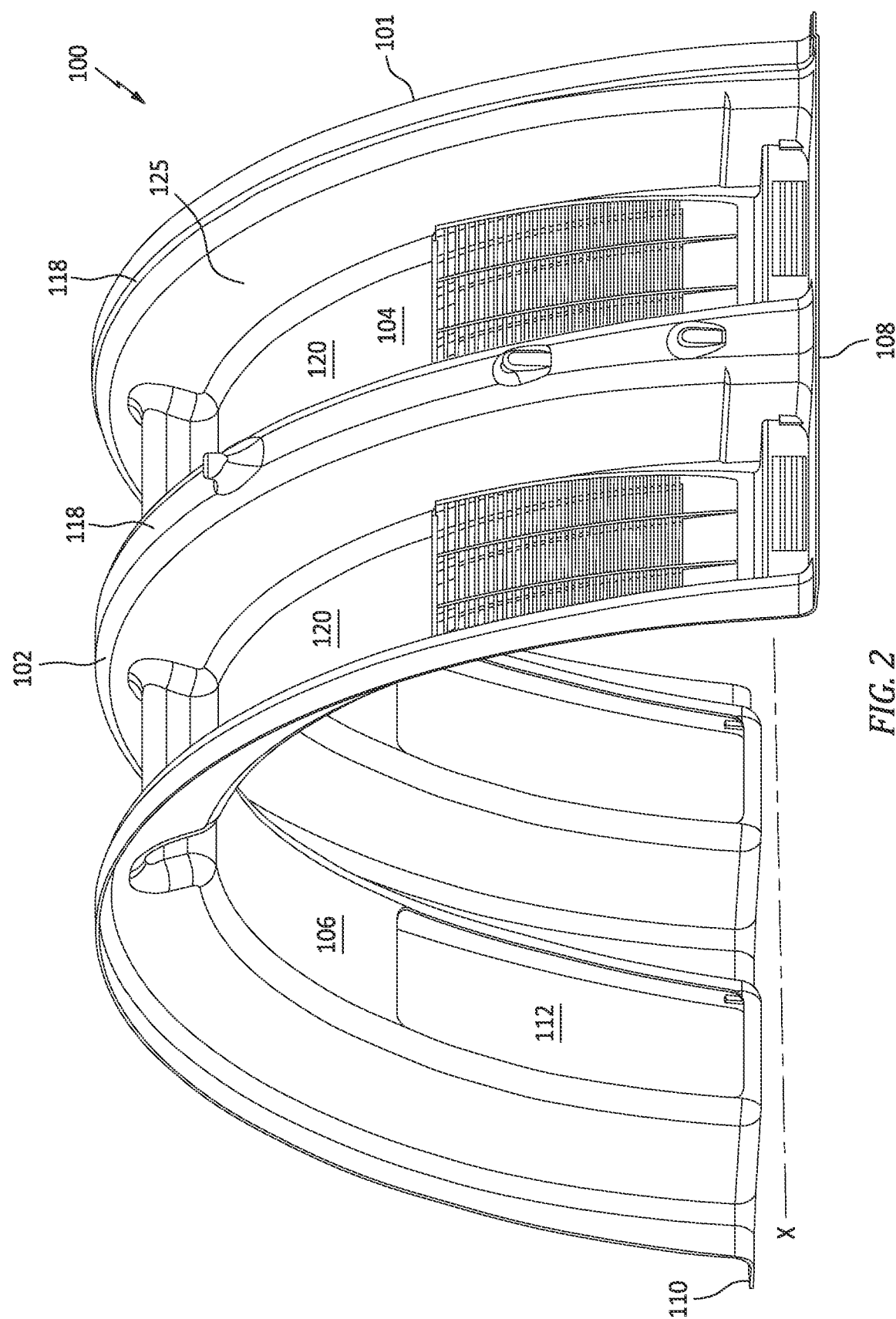
FIG. 2 front side view of a section of a leaching chamber having louvers, in accordance with one embodiment of the invention.
Figure 3:
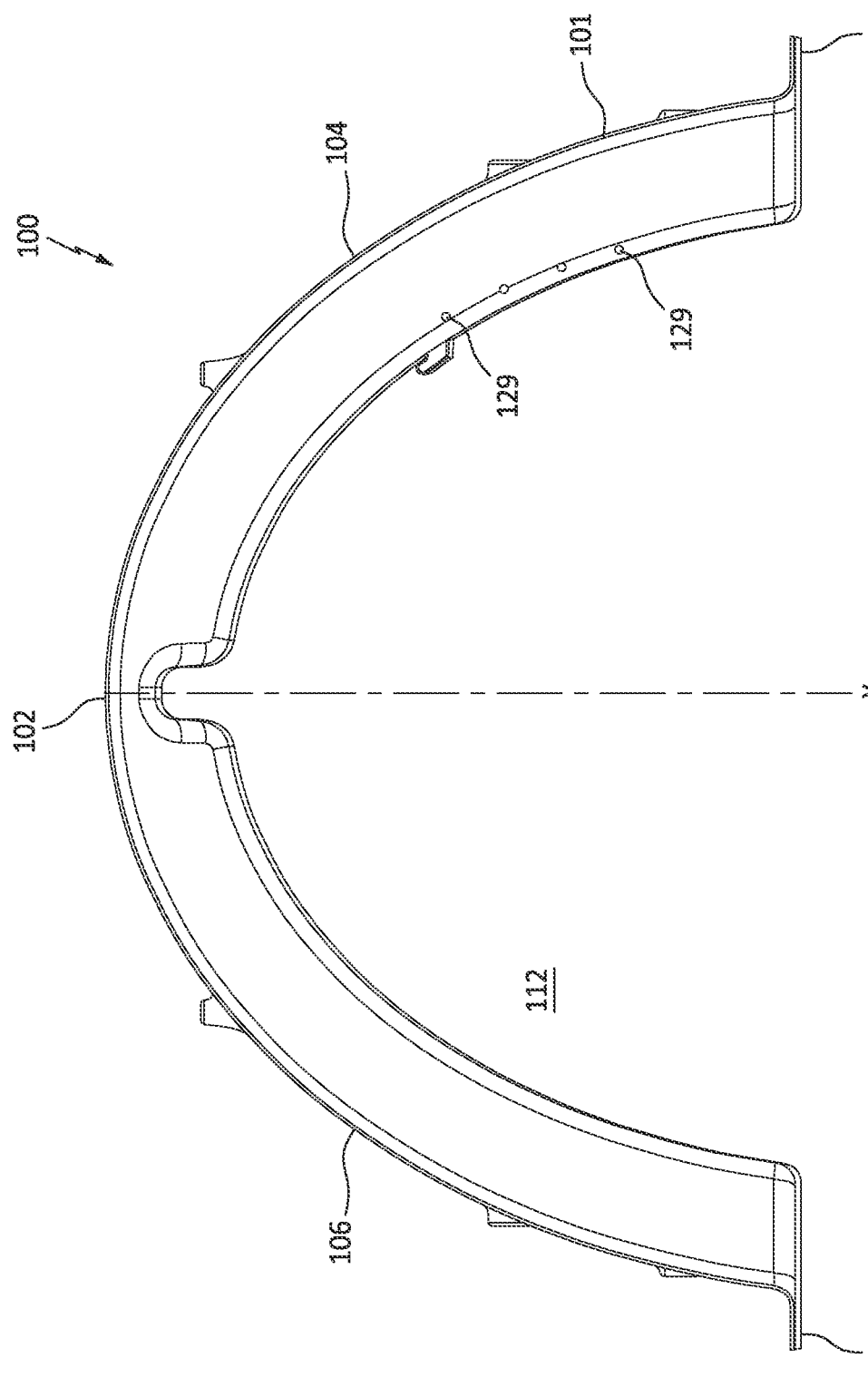
FIG. 3 is a front view of the leaching chamber section of FIG. 2.
Figure 4:
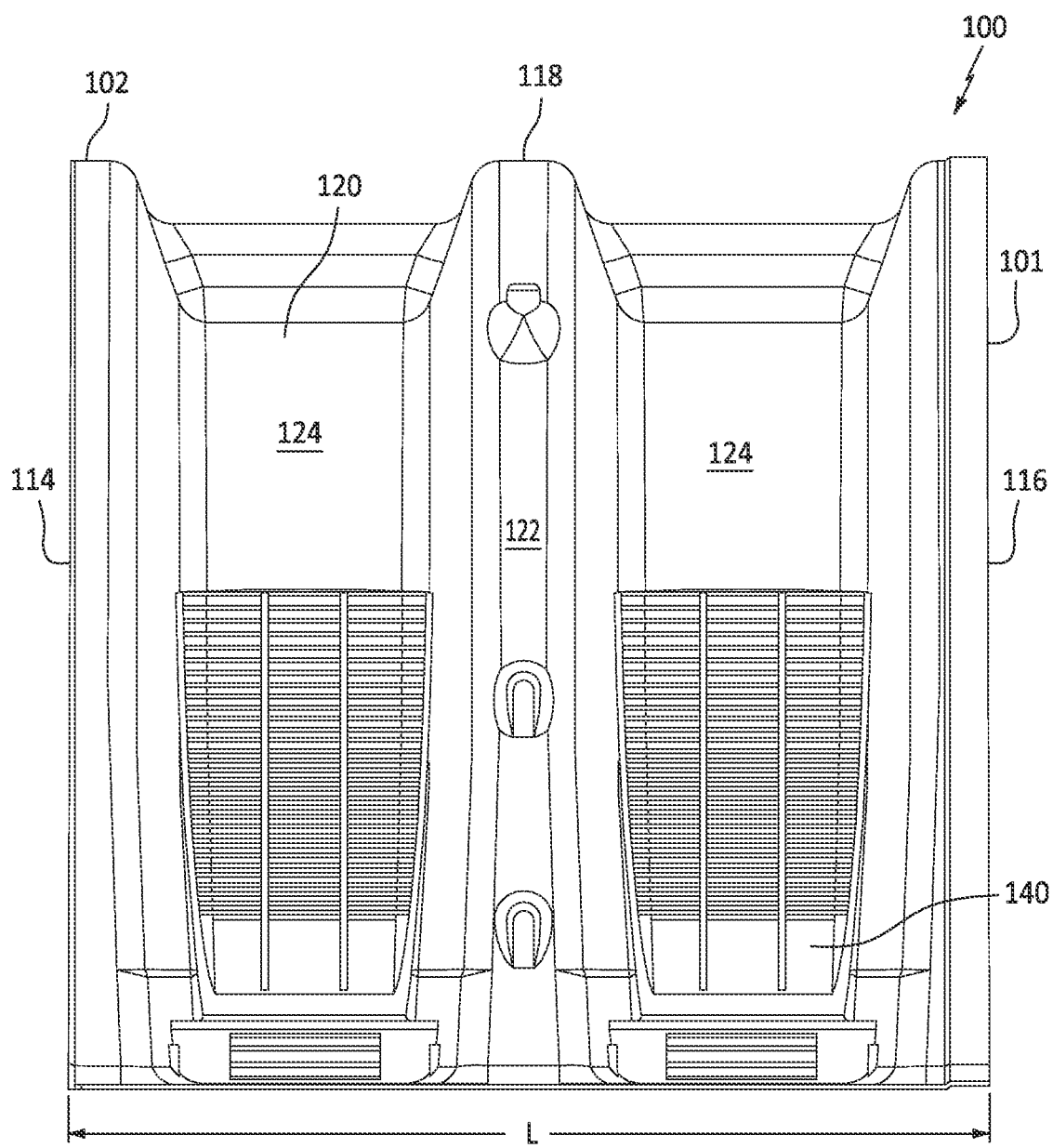
FIG. 4 is a side view of the leaching chamber section of FIG. 2.
Figure 5:
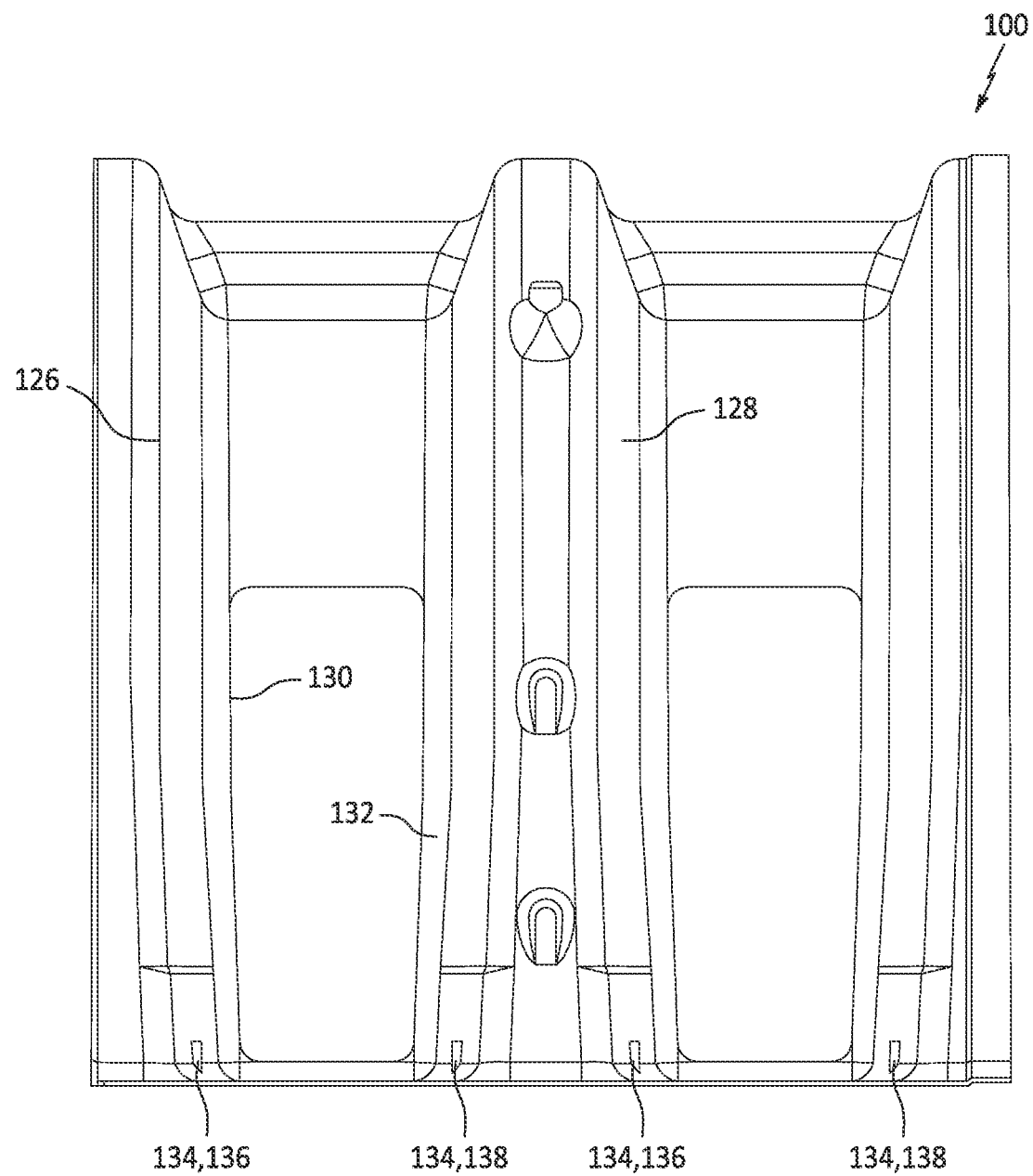
FIG. 5 is a side view of the leaching chamber section of FIG. 2 without louvers.
Figure 6:
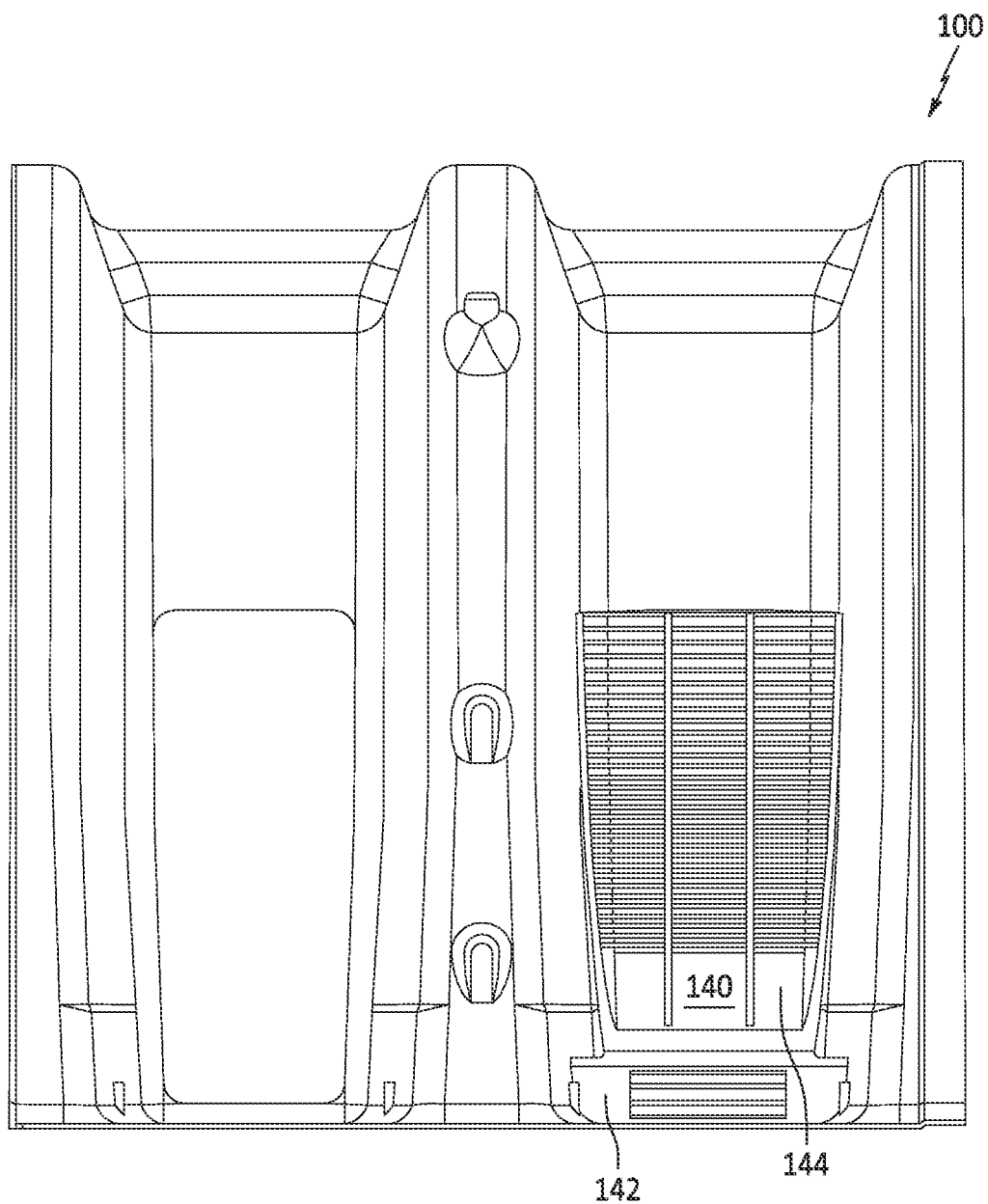
FIG. 6 is a side view of the leaching chamber section of FIG. 2 having only one louver article.
Figure 7:
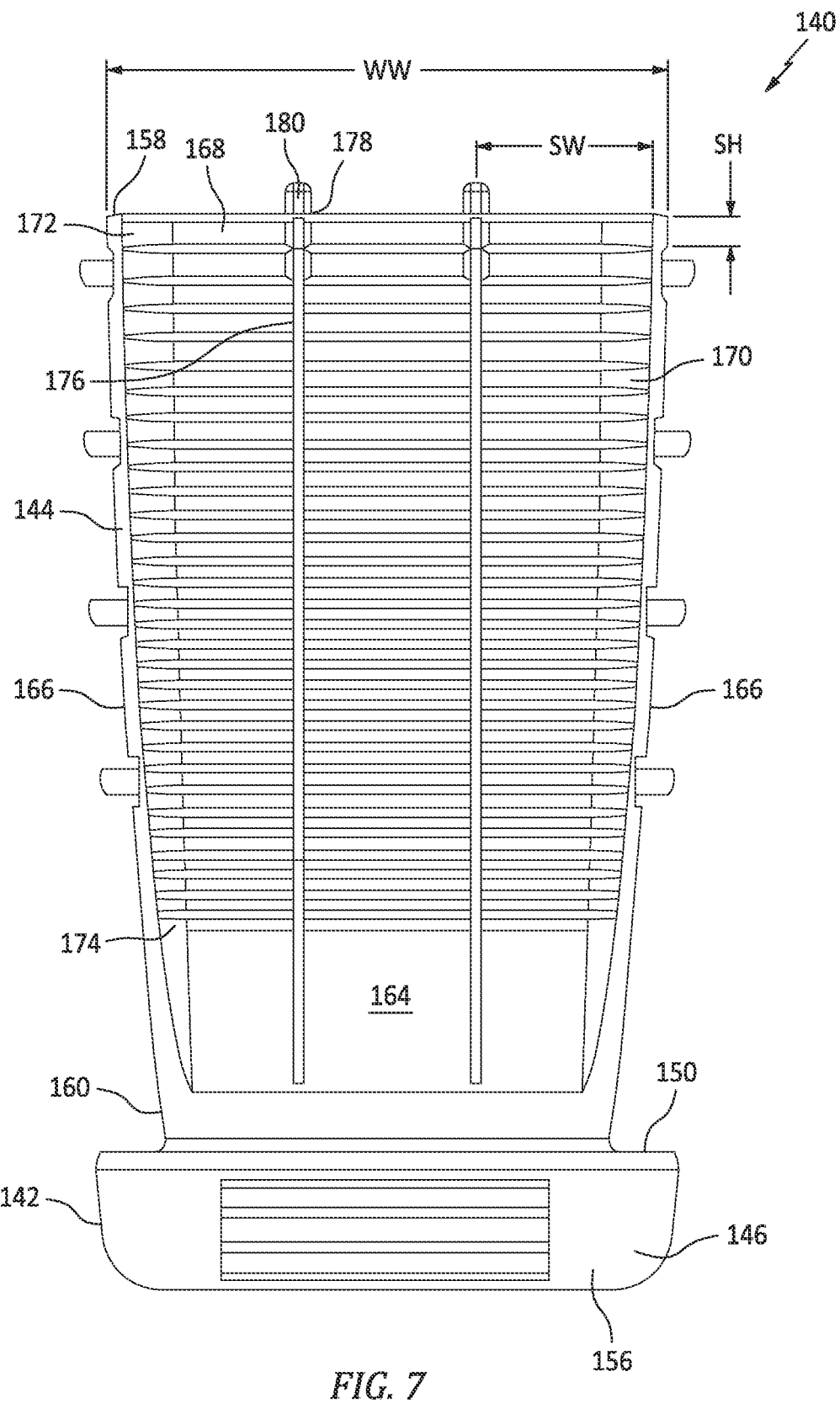
FIG. 7 is a front view of a louver article for use with the leaching chamber of FIG. 2, in accordance with one embodiment of the invention.
Figure 8:
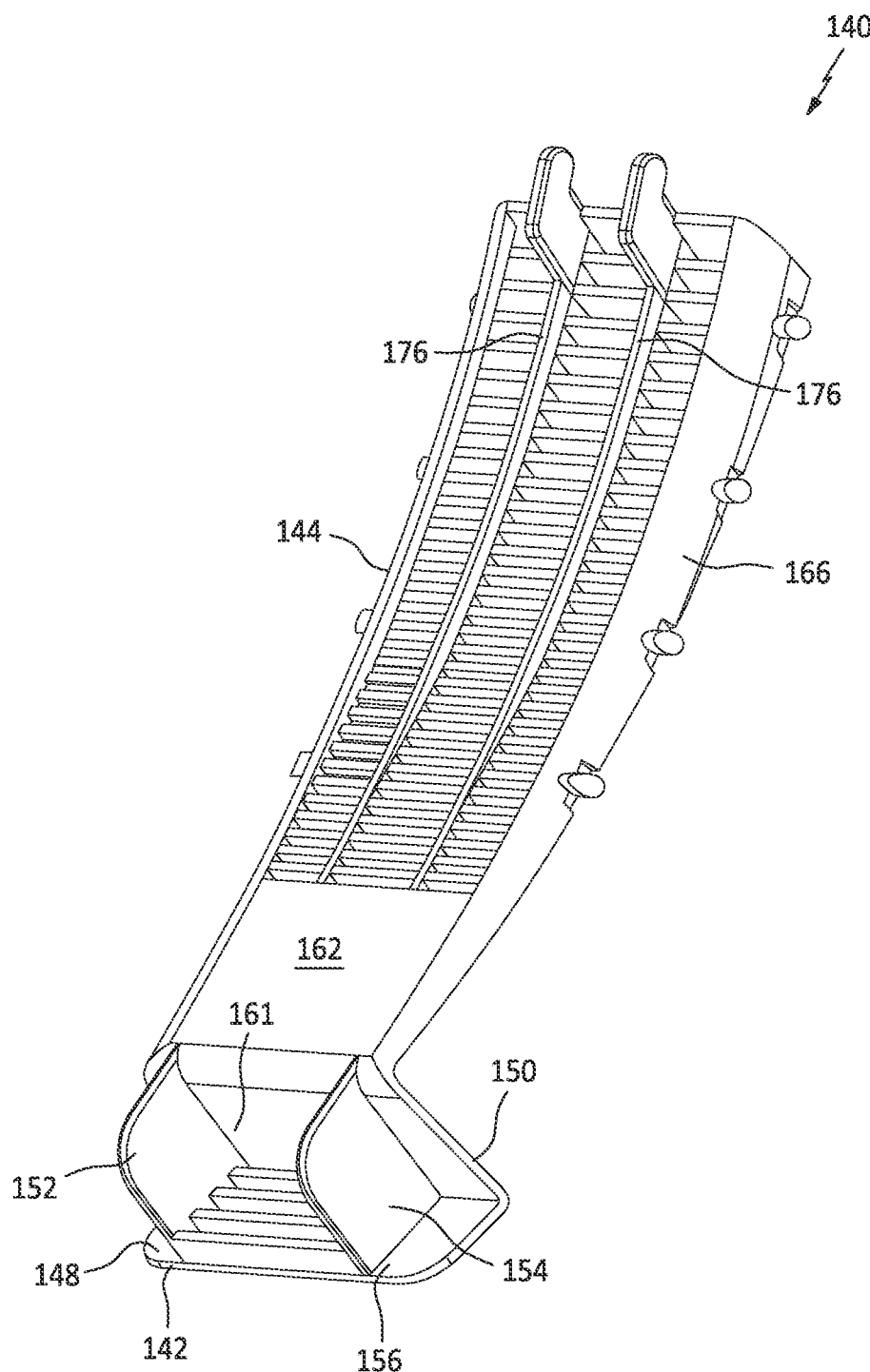
FIG. 8 shows a rear side view of the louver article of FIG. 7.
Figure 9:
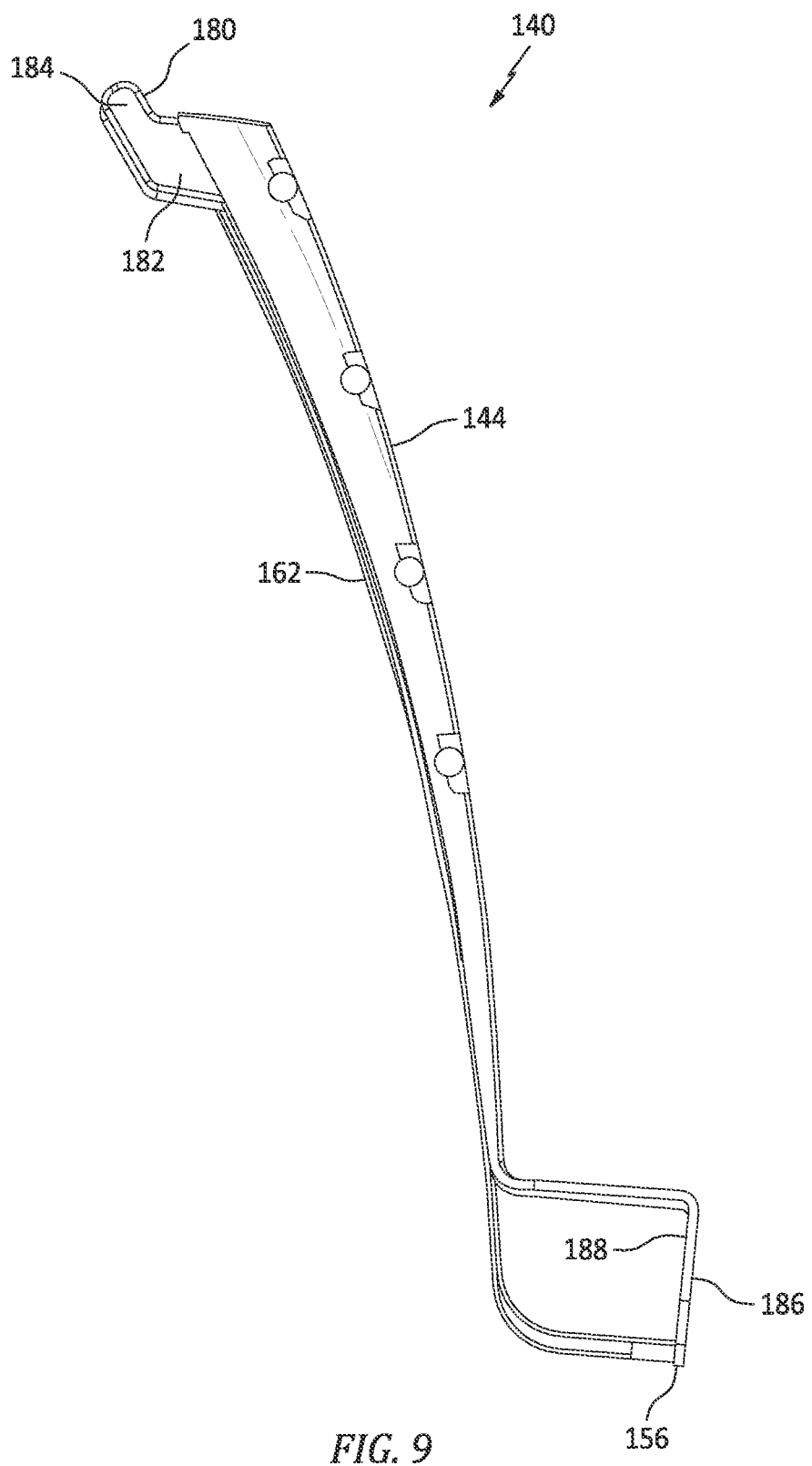
FIG. 9 shows a side view of a louver article of FIG. 7.

As discussed hereinafter and in accordance with the present invention, a leaching chamber having an arch shaped cross section chamber with side openings and louvers and having a base that is constructed from a Polyethylene terephthalate, or PET, material is disclosed, in accordance with one embodiment. It should be appreciated that the louvers are constructed from at least one of a Polyethylene (PE) and a Polypropylene (PP) material.

Referring to FIG. 2-FIG. 11, a section of a leaching chamber 100 in accordance with one embodiment of the invention is shown, wherein the leaching chamber 100 includes a chamber structure 101 which defines a chamber top 102, a chamber first side wall 104, a chamber second side wall 106, a chamber first base flange 108 and a chamber second base flange 110, wherein the chamber top 102, the chamber first side wall 104 and the chamber second side wall 106 define a chamber cavity 112 for containing liquid when the leaching chamber 100 is buried within soil. The chamber first side wall 104 and the chamber first base flange 108 are disposed on one side of the leaching chamber 100 and the chamber second side wall 106 and the chamber second base flange 110 are disposed on the opposing side of the leaching chamber 100. The chamber first side wall 104 and the chamber second side wall 106 extend upwardly from the chamber first base flange 108 and the chamber second base flange 110, respectively, to form the chamber top 102. The leaching chamber 100 further includes a chamber first end 114, a chamber second end 116 and a chamber length L, wherein the chamber length L extends between the chamber first end 114 and the chamber second end 116. The leaching chamber 100 also includes a chamber length axis X and a chamber vertical axis Y, wherein the chamber length axis X extends along the lengthwise direction of the leaching chamber 100.

The chamber structure 101 defines a plurality of alternating peak corrugations 118 (also referred to as "peaks") and valley corrugations 120 (also referred to as "valleys"), wherein the peaks 118 include peak tops 122 and the valleys 120 include valley bottoms 124. It should be appreciated that the peaks 118 are connected to the valleys 120 via corrugation sidewalls 125 which include an arch-curving (i.e. upwardly running) peak sidewall portion 126 and an arch-curving valley sidewall portion 128 that merge together to form the corrugation sidewall 125. The alternating peaks 118 and valleys 120 extend between the chamber first base flange 108 and the chamber second base flange 110 and run transverse to the chamber length L. The peaks 118 and valleys 120 provide the leaching chamber 100 with strength to resist overlying loads when the leaching chamber 100 is buried within soil during use. Each of the peaks 118 include the peak sidewall portion 126 which, in the chamber lengthwise direction, transitions indefinitely into the arch-curving valley sidewall portion 128 of the adjacent valleys 120. It should be appreciated that the shared portions of the peak sidewall portion 126 and the valley sidewall portion 128 have been referred to as webs in some prior patents.

The valley bottoms 124 define a leach opening 130 having a leach opening edge 132 and at least one retention tab 134, wherein the leach opening edge 132 is at least partially surrounding the leach opening 130 and wherein the at least one retention tab 134 includes a first tab 136 and a second tab 138. It should be appreciated that the first tab 136 is located on the arch-curving side 128 of one side of the valley 120 and the second tab 138 is located on the arch-curving side 128 of the other side of the valley 120, wherein both the first tab 136 and the second tab 138 are located proximate the first and second base flanges 108, 110. It should be appreciated that the chamber structure 101 further defines one or more tab slots 129 in the corrugated sidewalls 125, wherein the one or more tab slots 129 may be located proximate the leach opening 130 and the valley side 128. The leaching chamber 100 further includes a louver article 140 having a louver article base 142 and a louver article wall 144, wherein the louver article base 142 includes a louver article base front 146, a louver article base rear 148, a louver article base top 150, a louver article base first support 152, a louver article base second support 154 and a louver article base wall 156. The louver article wall 144 includes a louver article wall top 158, a louver article wall bottom 160, a louver article wall rear 162, a louver article wall front 164, louver article wall sides 166 and a louver article wall width WW. It should be appreciated that the louver article wall width WW is larger proximate the louver article wall top 158 than the louver article wall width WW proximate the louver article wall bottom 160.

Referring to FIG. 7, FIG. 8, FIG. 9 and FIG. 10A-C, it should be appreciated that the louver article wall 144 defines a plurality of slot openings 168 which communicate the louver article wall front 164 with the louver article wall rear 162, wherein each of the plurality of slot openings 168 include a slot opening width SW, a slot opening height SH and a slot opening depth SD, wherein the slot opening width SW is larger than the slot opening height SH. It should be appreciated that the louver article wall 144 may be curved between the louver article wall top 158 and the louver article wall bottom 160 to approximate at least a portion of the curvature of the arch shaped chamber first side wall 104 and the arch shaped chamber second side wall 106. The plurality of slot openings 168 are arranged as a plurality of slot rows 170 that extend at least partially between the louver article wall sides 166 and between the louver article wall top 158 and the louver article wall bottom 160, wherein the plurality of slot rows 170 include a top slot row 172 and a bottom slot row 174, wherein the top slot row 172 may be located proximate the louver article wall top 158 and wherein the plurality of slot rows 170 extend at least partial down the louver article wall 144. Additionally, the louver article wall 144 includes a plurality of louver article wall spines 176 which extends at least partially between the louver article wall top 158 and the louver article wall bottom 160. In this embodiment, there are two (2) louver article wall spines 176, which divide the plurality of slot rows 170 into three (3) columns, wherein each of the louver article wall spines 176 includes a louver article wall spine top 178. It should be appreciated that the louver article wall spine top 178 includes a louver article mounting structure 180, wherein the louver article mounting article structure 180 extends outwardly from the louver article wall rear 162 and includes a mounting article shank portion 182 and a mounting article hook portion 184.

Figure 10A:
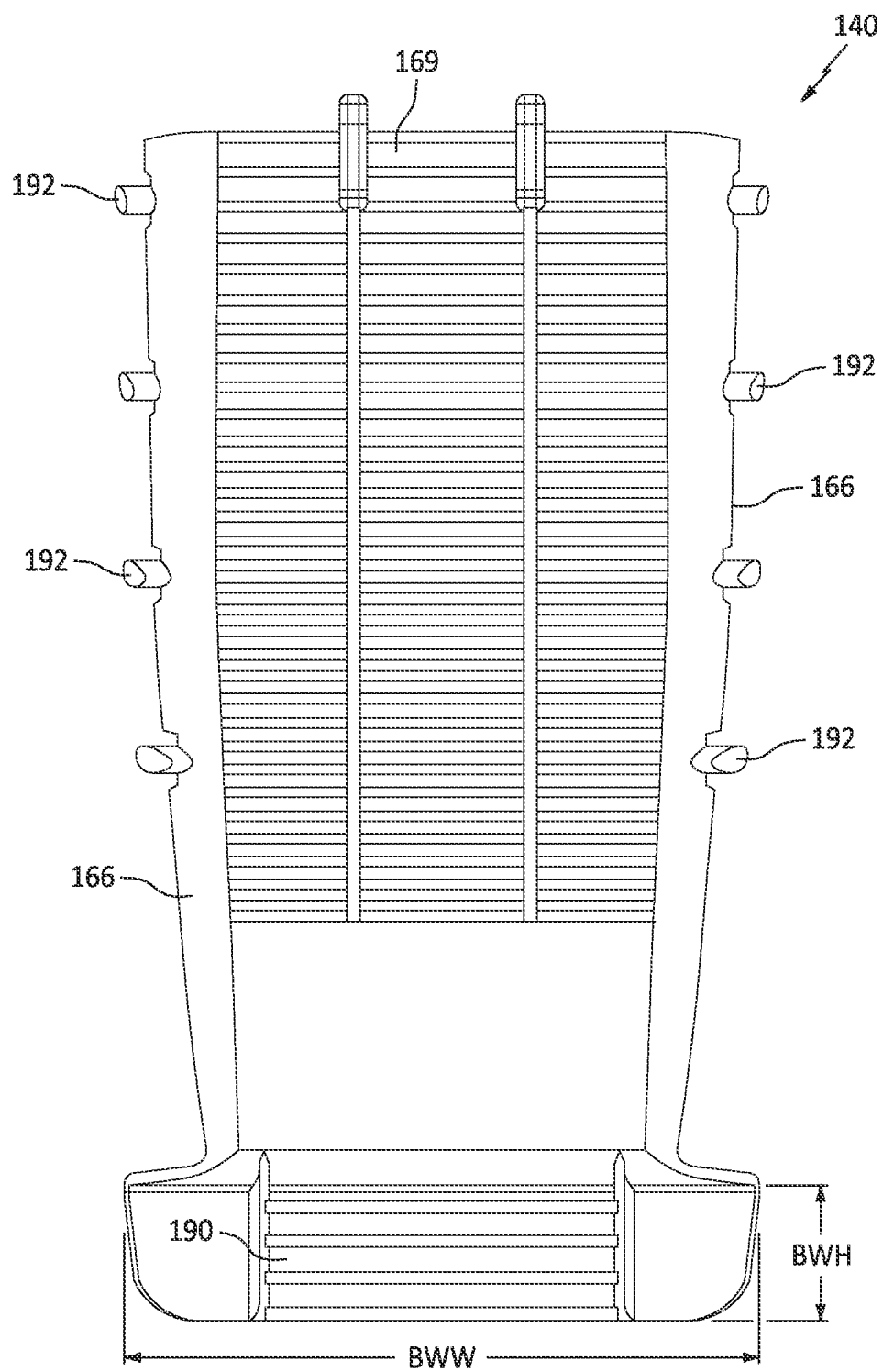
FIG. 10A is a rear view of the louver article of FIG. 7.
Figure 10B:
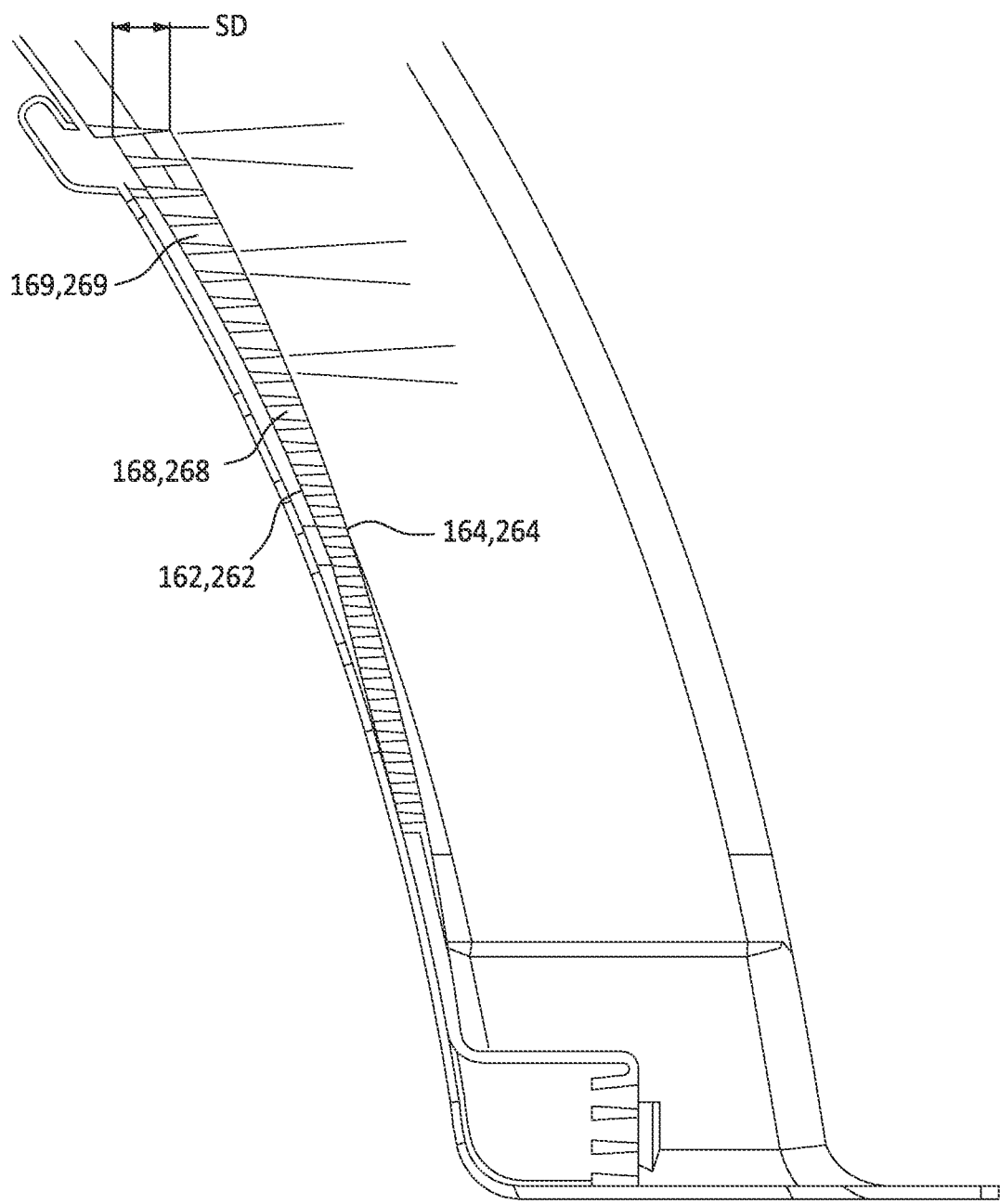
FIG. 10B is a side sectional view of the louver article of FIG. 7 associated with the valley of the leaching chamber of FIG. 2, in accordance with one embodiment of the invention.
Figure 11:
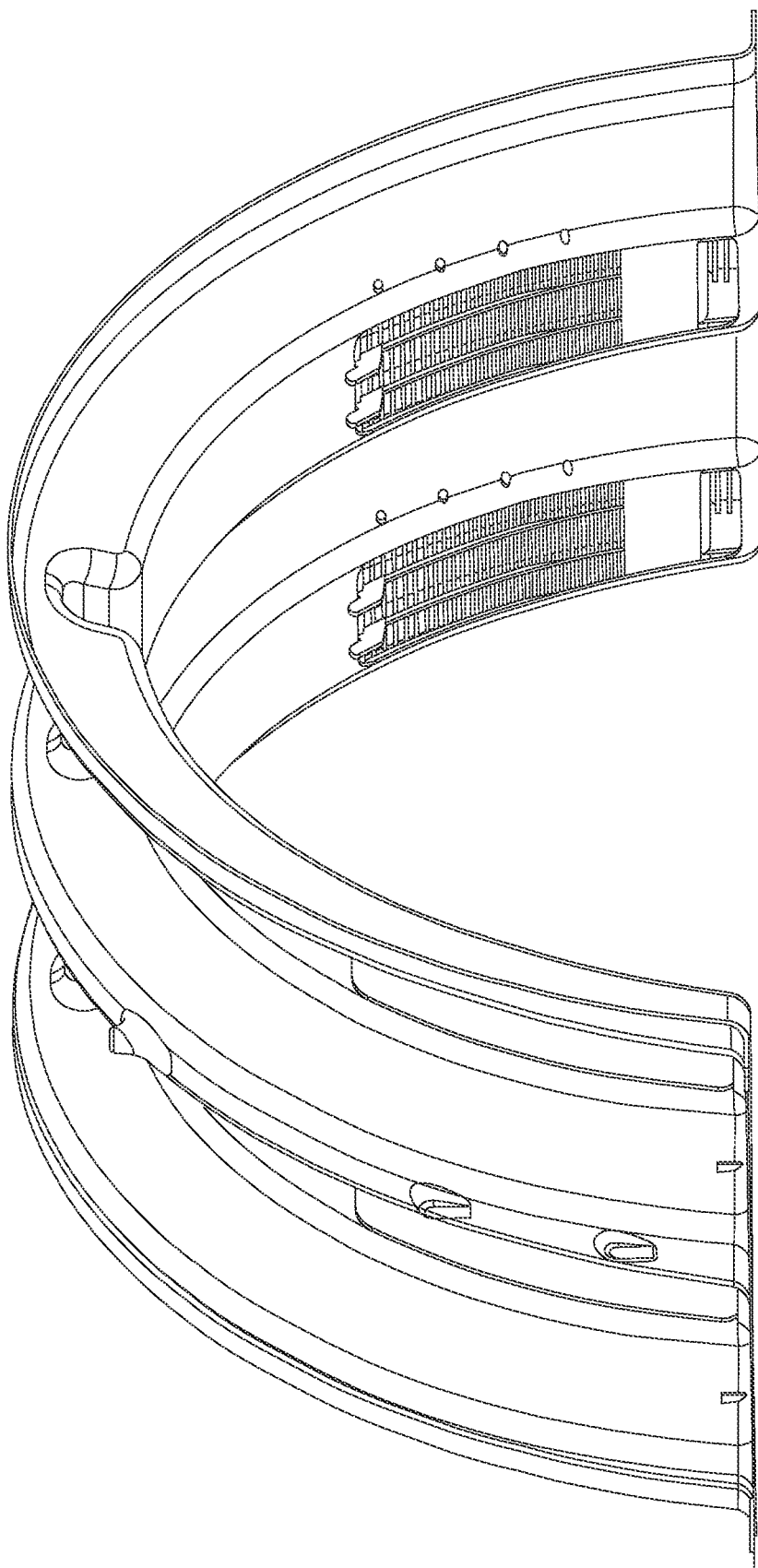
FIG. 11 is a front side isometric view of a section of the leaching chamber of FIG. 2 showing the inside wall of the valleys with the louver article of FIG. 7 associated, in accordance with one embodiment of the invention.
Figure 12A:
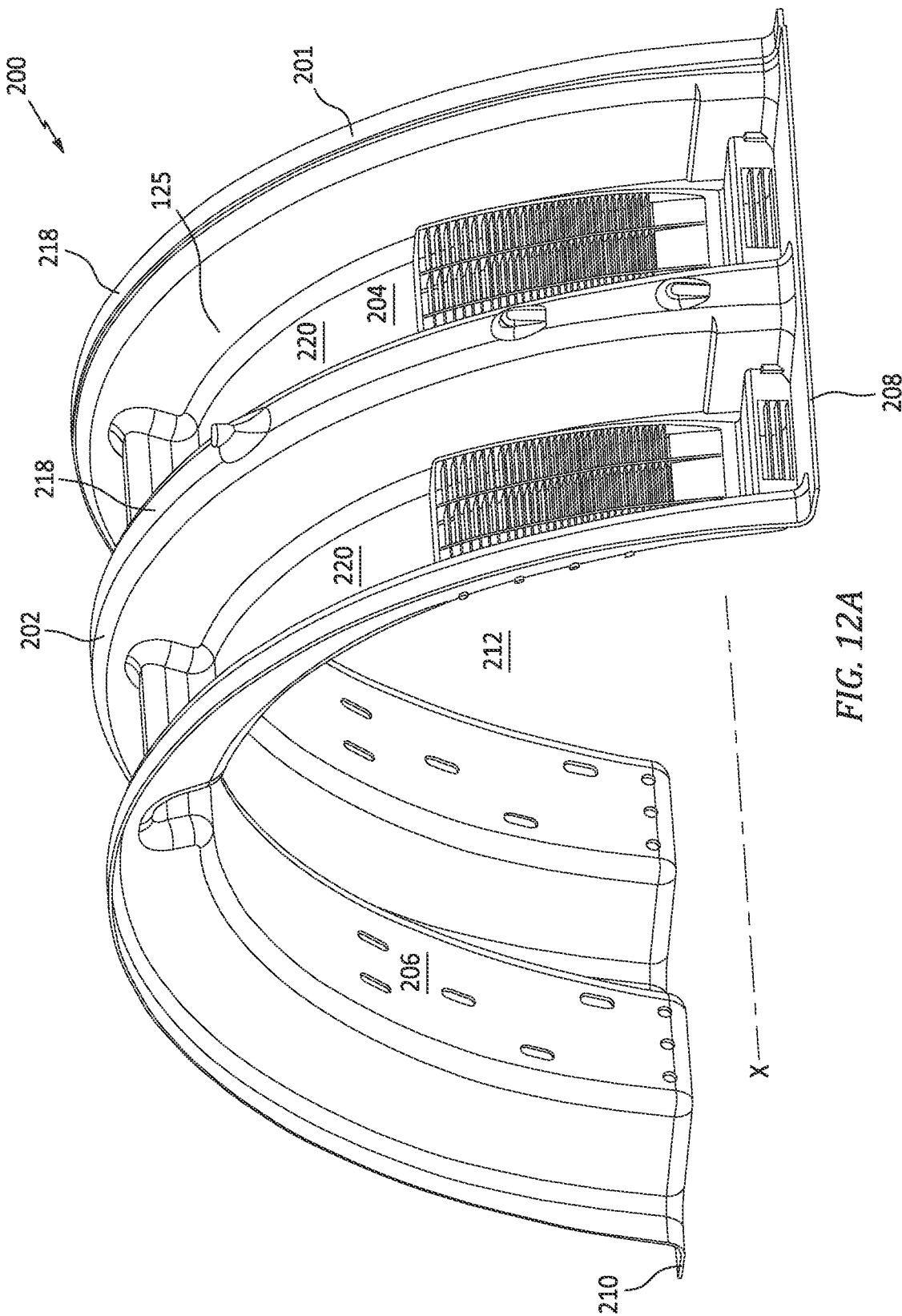
FIG. 12A front side view of a section of a leaching chamber having louvers, in accordance with one embodiment of the invention.
Figure 12B:
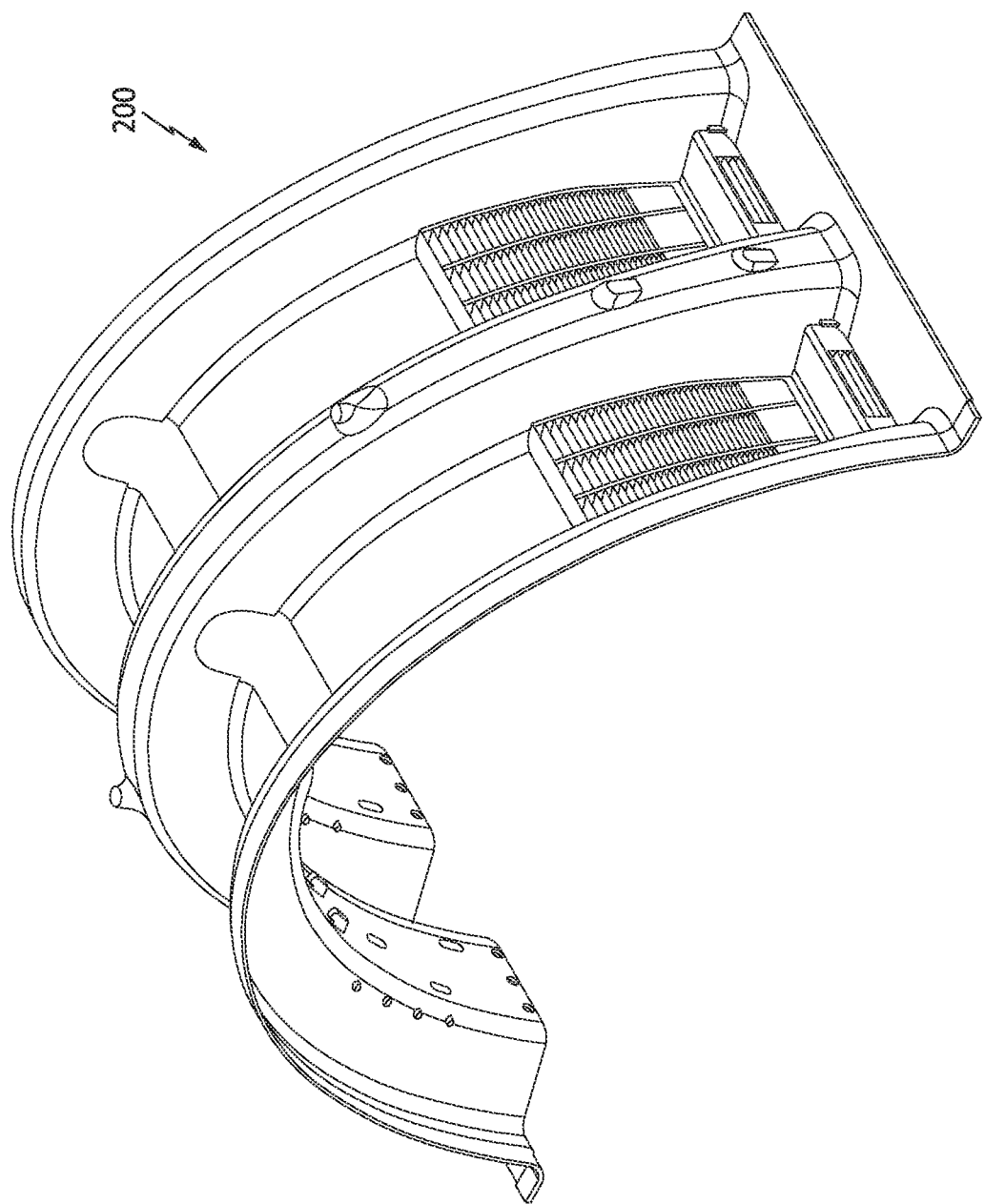
FIG. 12B front side view of a section of a leaching chamber having louvers, in accordance with one embodiment of the invention.
Figure 12C:
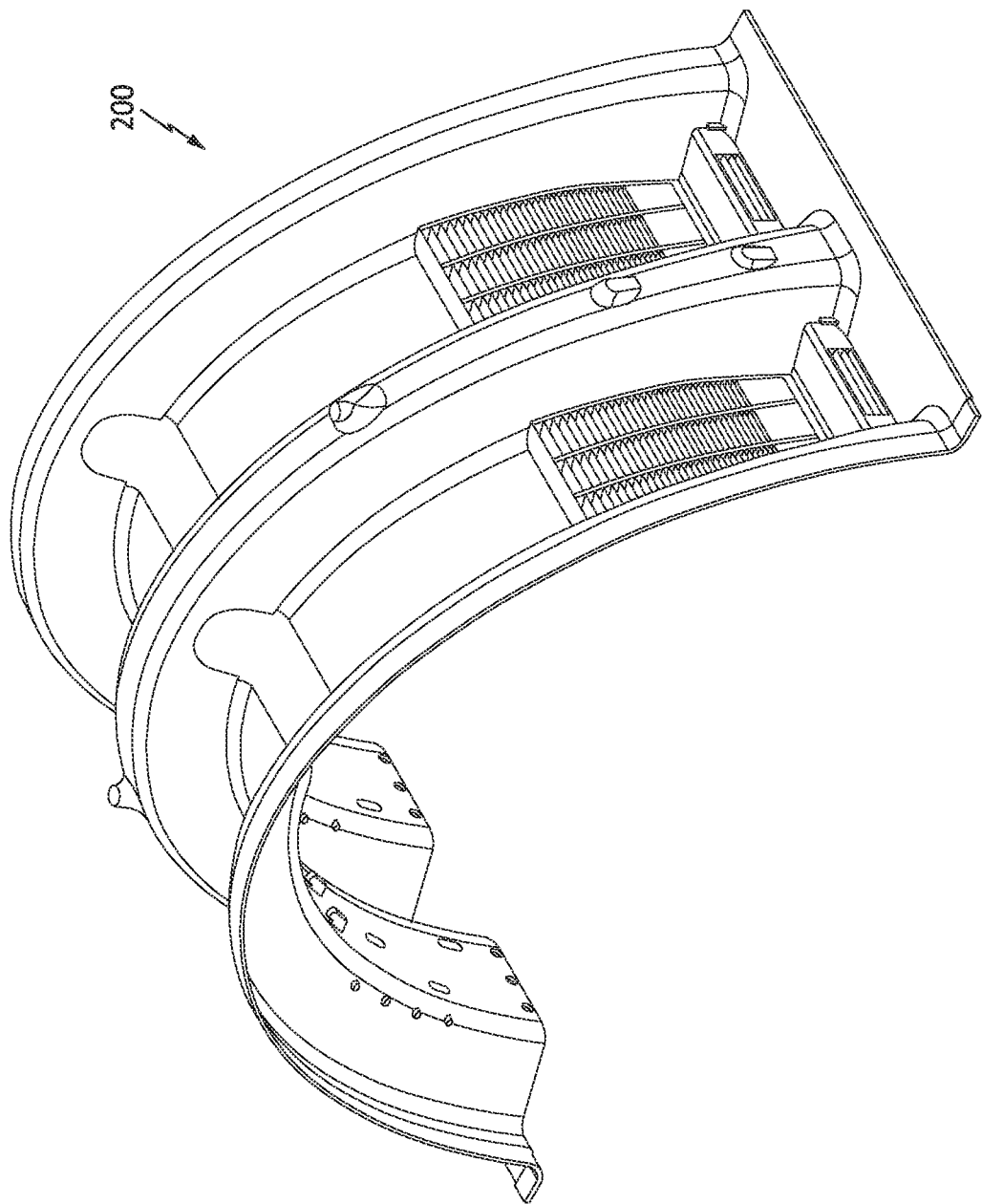
FIG. 12C front side view of a section of a leaching chamber having louvers, in accordance with one embodiment of the invention.
Figure 13:
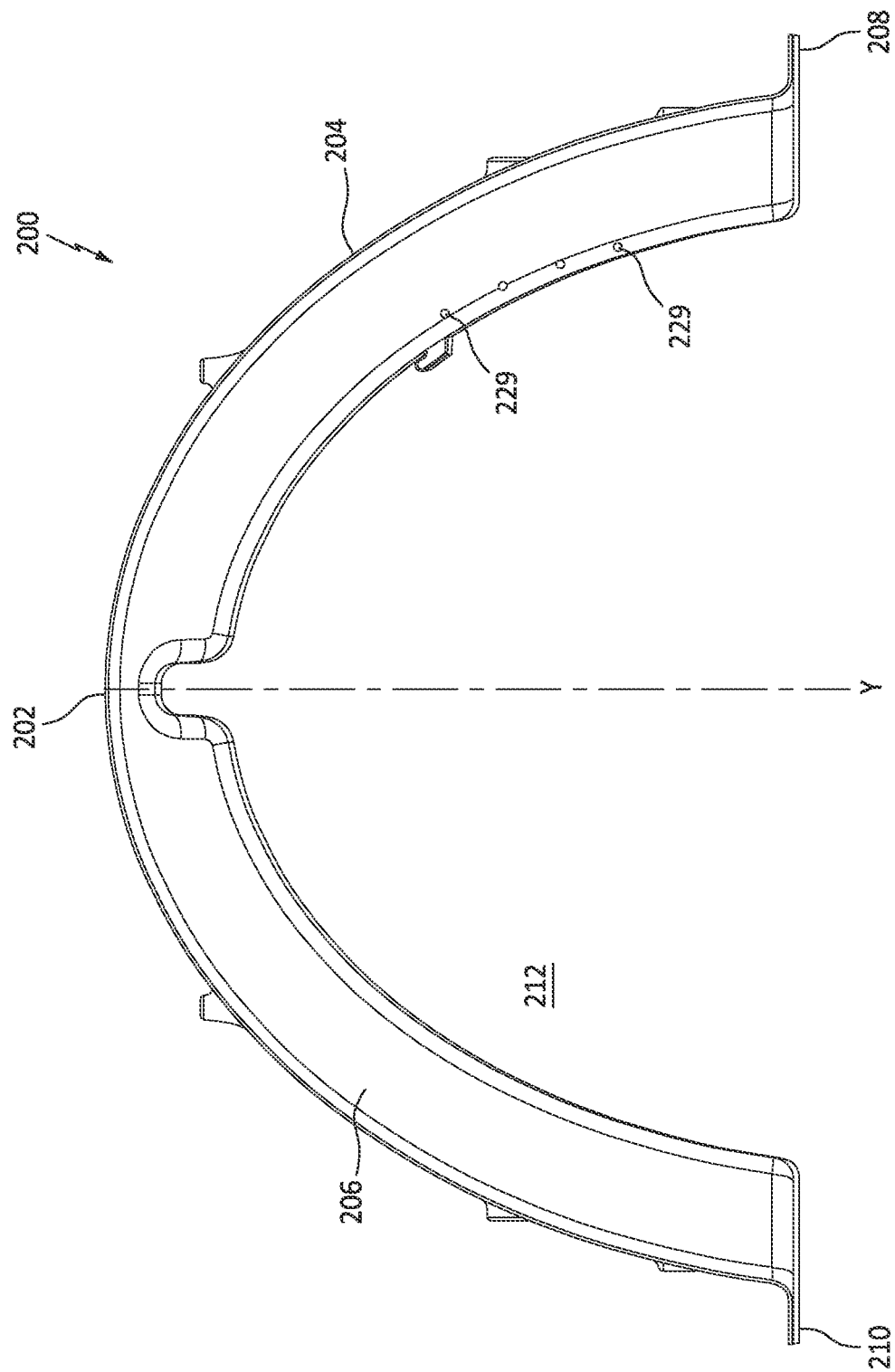
FIG. 13 is a front view of the leaching chamber section of FIG. 12A.
Figure 14:
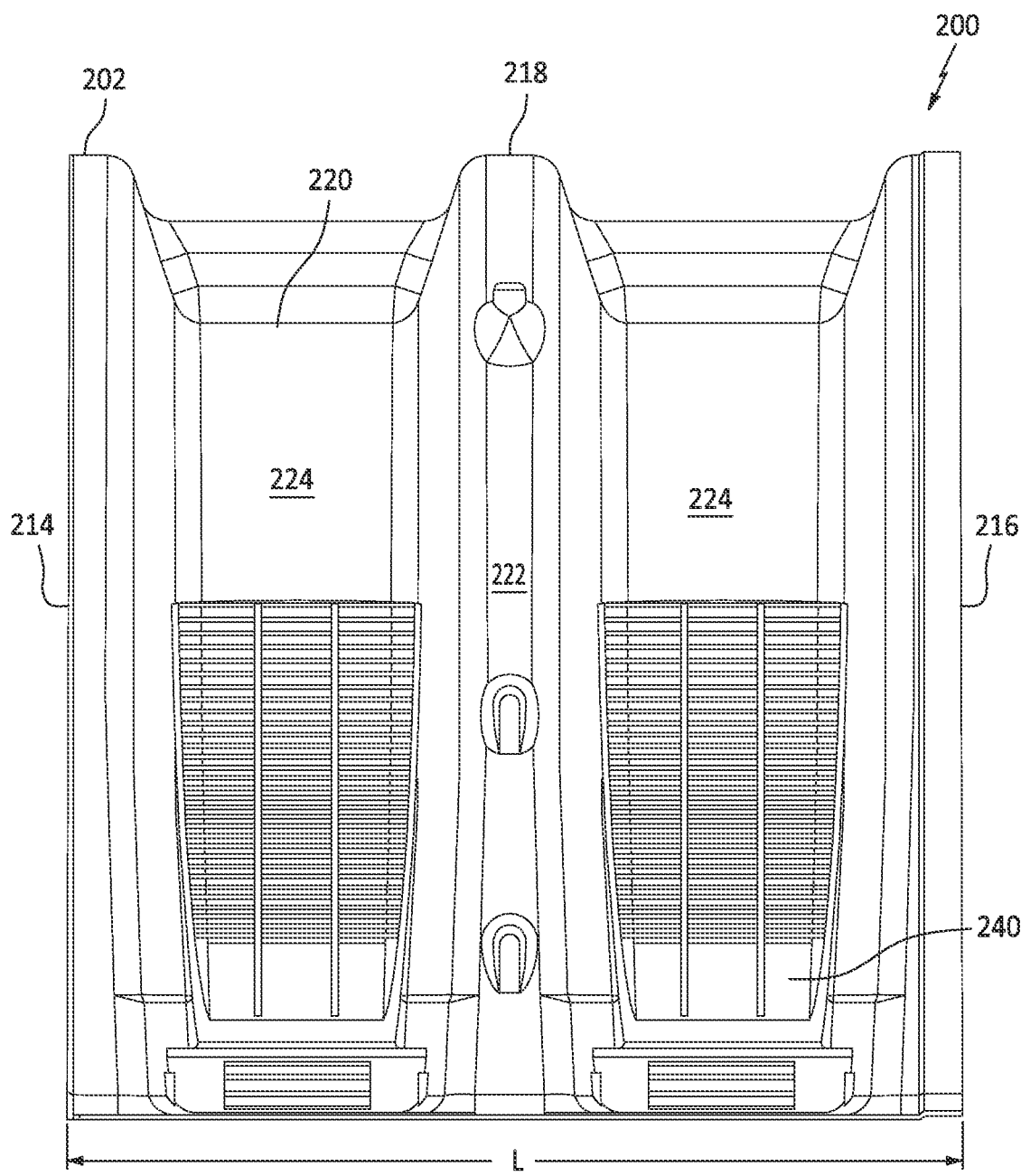
FIG. 14 is a side view of the leaching chamber section of FIG. 12A.
Figure 15:
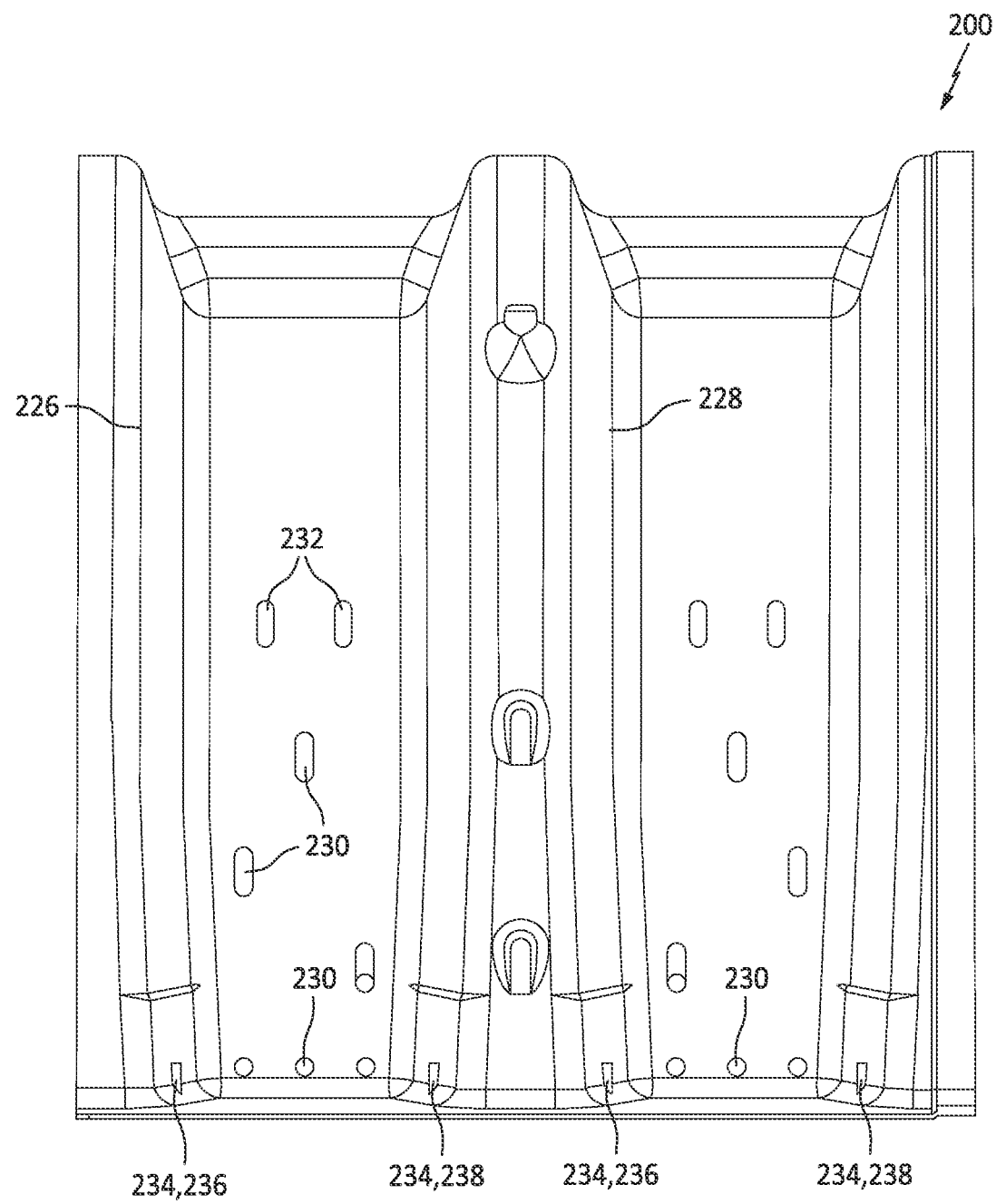
FIG. 15 is a side view of the leaching chamber section of FIG. 12A without louvers.
Figure 16:
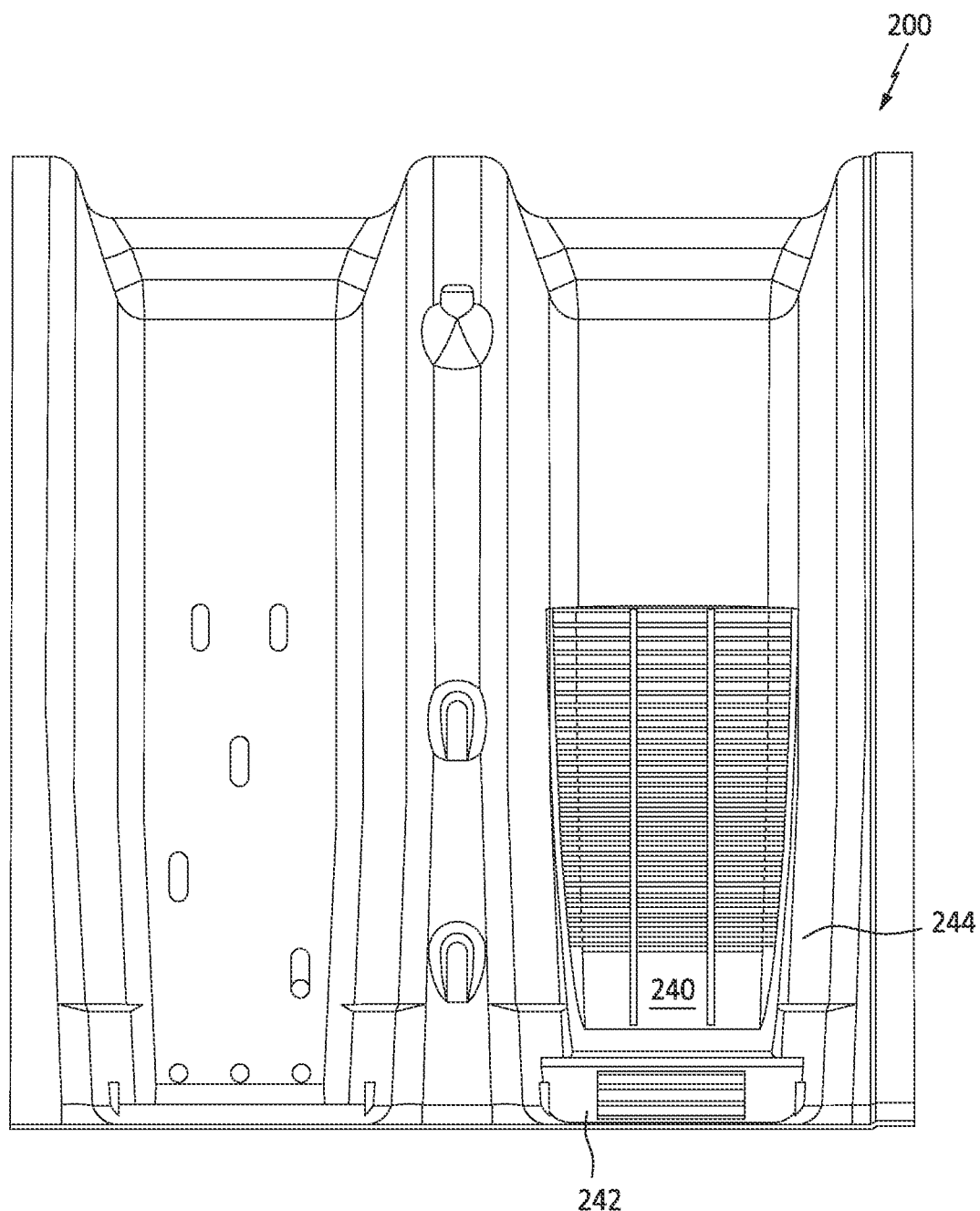
FIG. 16 is a side view of the leaching chamber section of FIG. 12A having only one louver article.
Figure 17:
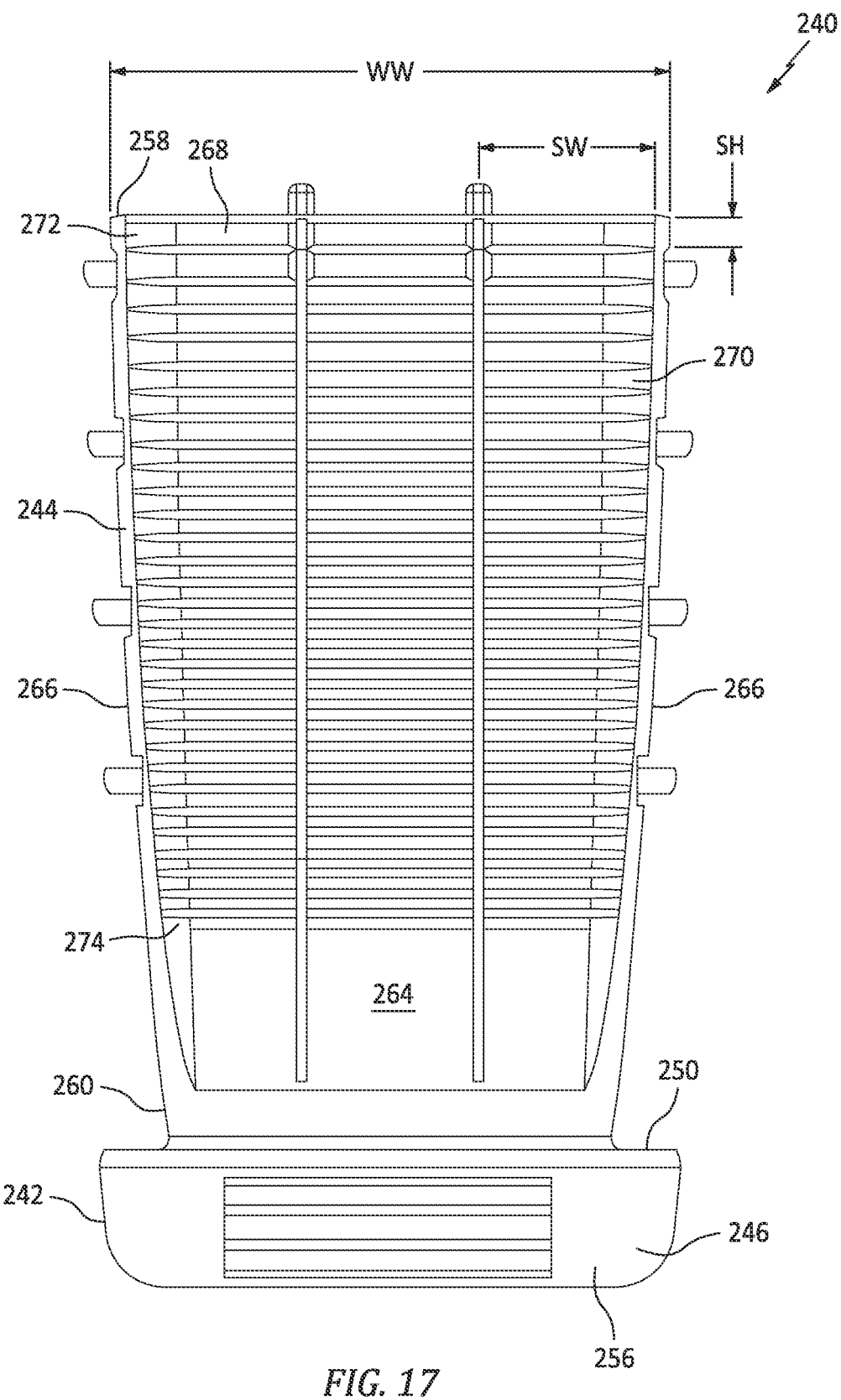
FIG. 17 is a front view of a louver article for use with the leaching chamber of FIG. 12, in accordance with another embodiment of the invention.
Figure 18:
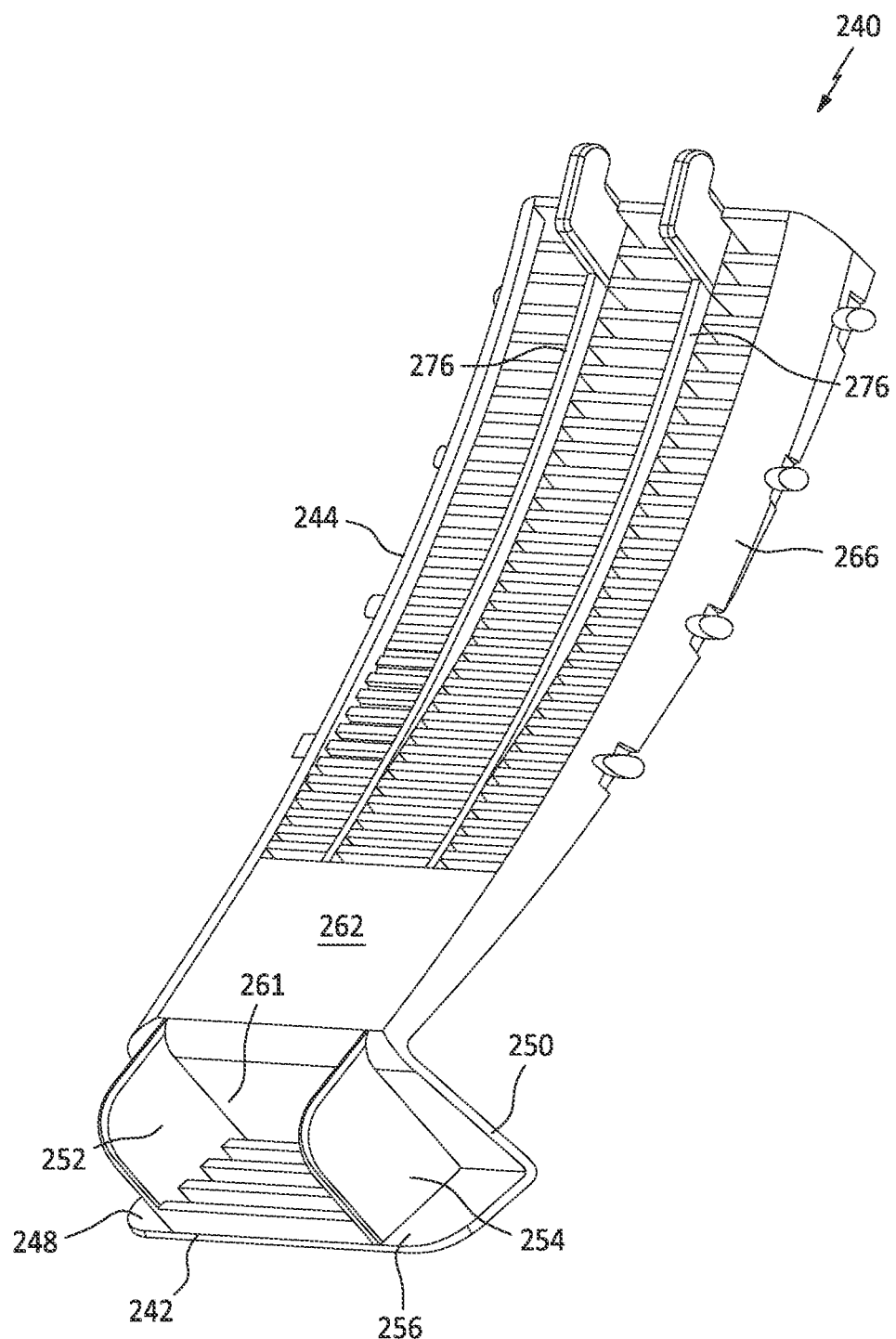
FIG. 18 shows a rear side view of the louver article of FIG. 17.
Figure 19:
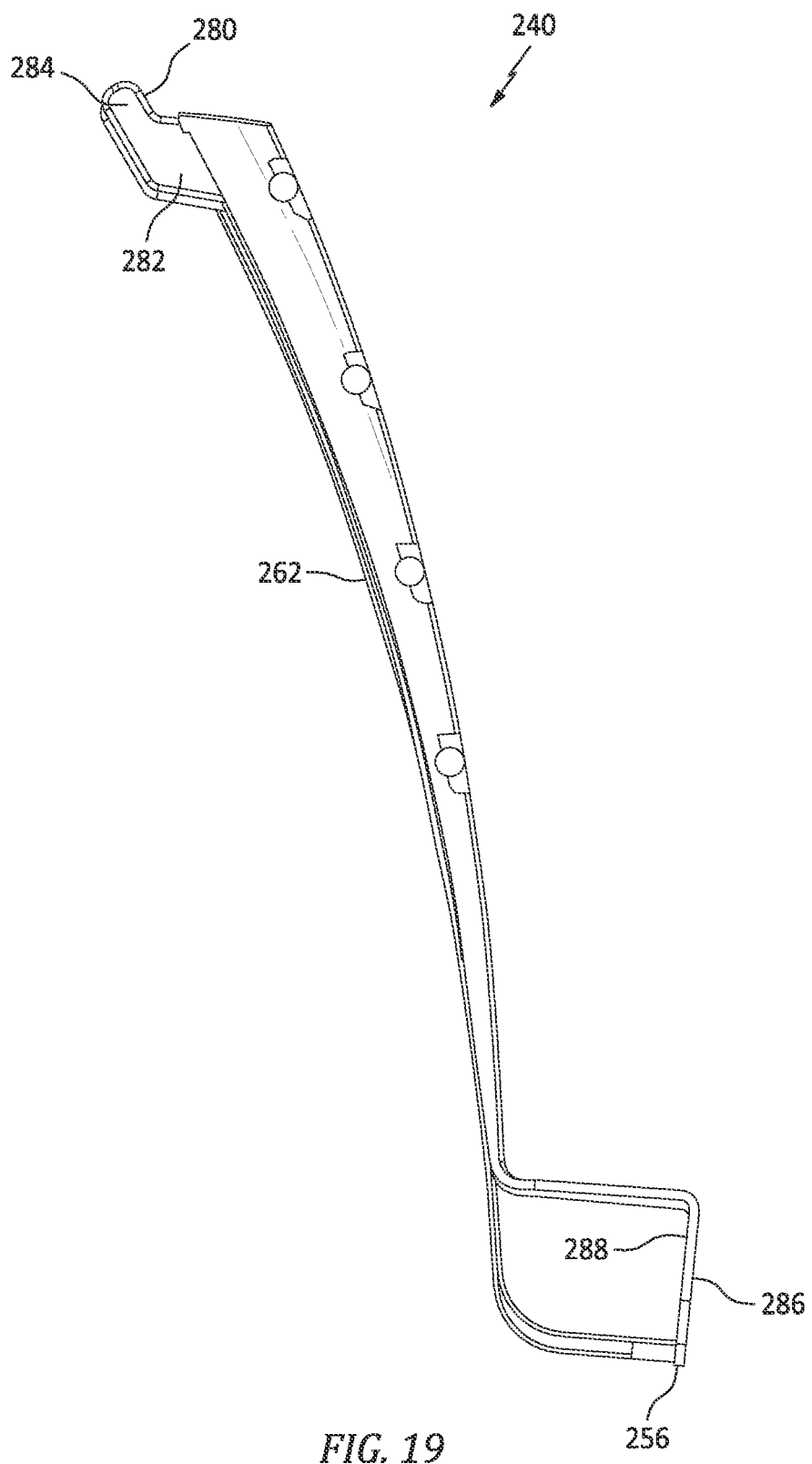
FIG. 19 shows a side view of a louver article of FIG. 17.

Referring to FIG. 10B, one embodiment of the louver article 140 is shown having the louver article wall 144 which includes the plurality of slot openings 168, wherein the plurality of slot openings 168 traverse the thickness SD of the louver article wall 144 to communicate the louver article wall front 164 with the louver article wall rear 162. It should be appreciated that the slot opening height SH located proximate the louver article wall front 164 is larger than the slot opening height SH located proximate the louver article wall rear 162. Moreover, the slot opening height SH of the slot openings 168 that are located proximate the louver article wall top 158 are larger than the slot opening height SH of the slot openings 168 that are located proximate the louver article wall bottom 160. Additionally, referring to FIG. 10C, one embodiment of the louver article 140 is shown and includes two louver article wall spines 176 which extends between the louver article wall top 158 and the louver article wall bottom 160 and which divides the plurality of slot openings 168 into two (2) side columns 171 and one (1) center column 173. It should be appreciated that the slot opening widths SW of the slot openings 168 in side columns 171 located proximate the louver article wall top 158 are larger than the slot opening widths SW of the slot openings 168 in side columns 171 located proximate the louver article wall bottom 160. FIG. 10C illustrates example sizes of slot opening widths SW showing that they decrease in size from the louver article wall top 158 to the louver article wall bottom 160. Moreover, it should be further appreciated that the louver article 140 is located relative to the chamber structure 101 such that at least a portion of the louver article wall rear 160 is spaced apart from the chamber structure 101 by predefined distance.

The louver article base wall 156 includes a louver article base wall front 186, a louver article base wall rear 188, a louver article base wall height BWH and a louver article base wall width BWW. Additionally, the louver article base wall 156 may define a plurality of base front slot openings 190 which extend across the louver article base wall 156 and which communicate the louver article base wall front 186 with the louver article base wall rear 188. Moreover, the louver article 140 includes one or more tabs 192 located on the outer surface of the louver article wall sides 166 such that the tabs 192 extend out of the outer surface of the louver article wall sides 166. Thus, when the louver article 140 is securely associated with the leaching chamber 100, the one or more tabs 192 are located within the one or more tab slots 129. It should be appreciated that the louver article base top 150, louver article base first support 152, louver article base second support 154 and louver article base wall 156 define a louver article cavity 161 which is located between the louver article base wall 156 and the chamber structure 101 such that the base front slot openings 190 are separated from the chamber structure 101 by the louver article cavity 161.

It should be appreciated that the louver article 140 may be securely associated with the leaching chamber 100 by disposing the louver article 140 within valleys 120 using a 'snap-fit' configuration such that the louver article 140 is adjacent the leach opening edge 132 and such that each of the louver article mounting structures 180 are protruding through the leach opening 130 and into the chamber cavity 112. It should be appreciated that the mounting article shank portion 182 will limit movement of the louver article wall 144 upwardly along the valley bottom 124 and the mounting article hook portion 184 will limit movement of the louver article wall 144 laterally outward from the valley bottom 124. Additionally, the louver article base wall 156 may be disposed proximate the chamber base flange 108, 110 associated with the specific valley 120 to be located behind the first tab 136 and the second tab 138 and to be disposed between the first tab 136 and the second tab 138 and the valley bottom 124. It should be appreciated that the first tab 136 and the second tab 138 will prevent the louver article base 142 from moving laterally and outwardly away from the valley bottom 124. Moreover, each of the tabs 192 will be snugly contained within a tab slot 129 to provide for a secure association of the louver article 140 with the leaching chamber 100. It should be appreciated that in one embodiment, one or more of the tab slots 129 may be a through-hole thereby traversing the thickness of the chamber structure 101, while in another embodiment, one or more of the tab slots 129 may be a depression and may not traverse the thickness of the chamber structure 101.

It should be appreciated that the leach opening 130 is configured to be communicated with the plurality of slot openings 168 and the plurality of base front slot openings 190. This advantageously allows liquid contained with the chamber cavity 112 to leach out of the leach opening 130, through the plurality of slot openings 168 and the plurality of base front slot openings 190 and into the surrounding soil. It should be further appreciated that the leaching chamber 100 may be constructed from a Polyethylene terephthalate, or PET, material, while the louver article may be constructed from a Polyethylene (PE) and/or a Polypropylene (PP) material to take advantage of the unique benefits of the PET material and the unique benefits of the PE and/or PP material.

Referring to FIG. 12A-FIG. 21, a section of a leaching chamber 200 in accordance with another embodiment of the invention is shown, wherein the leaching chamber 200 includes a chamber structure 201 which defines a chamber top 202, a chamber first side wall 204, a chamber second side wall 206, a chamber first base flange 208 and a chamber second base flange 210, wherein the chamber top 202, the chamber first side wall 204 and the chamber second side wall 206 define a chamber cavity 212 for containing liquid when the leaching chamber 200 is buried within soil. The chamber first side wall 204 and the chamber first base flange 208 are disposed on one side of the leaching chamber 200 and the chamber second side wall 206 and the chamber second base flange 210 are disposed on the opposing side of the leaching chamber 200. The chamber first side wall 204 and the chamber second side wall 206 extend upwardly from the chamber first base flange 208 and the chamber second base flange 210, respectively, to form the chamber top 202. The leaching chamber 200 further includes a chamber first end 214, a chamber second end 216 and a chamber length L, wherein the chamber length L extends between the chamber first end 214 and the chamber second end 216. The leaching chamber 200 also includes a chamber length axis X and a chamber vertical axis Y, wherein the chamber length axis X extends along the lengthwise direction of the leaching chamber 200.

The chamber structure 201 defines a plurality of alternating peak corrugations 218 (also referred to as "peaks") and valley corrugations 220 (also referred to as "valleys"), wherein the peaks 218 include peak tops 222 and the valleys 220 include valley bottoms 224. It should be appreciated that the peaks 218 are connected to the valleys 220 via corrugation sidewalls 225 which include an arch-curving (i.e. upwardly running) peak sidewall portion 226 and an arch-curving valley sidewall portion 228 that merge together to form the corrugation sidewall 225 The alternating peaks 218 and valleys 220 extend between the chamber first base flange 208 and the chamber second base flange 210 and run transverse to the chamber length L. The peaks 218 and valleys 220 provide the leaching chamber 200 with strength to resist overlying loads when the leaching chamber 200 is buried within soil during use. Each of the peaks 218 include the peak sidewall portion 226 which, in the chamber lengthwise direction, transitions indefinitely into the arch-curving valley sidewall portion 228 of the adjacent valleys 220. It should be appreciated that the shared sides of the peak sidewall portion 226 and valley sidewall portion 228 have been referred to as webs in some prior patents.

The valley bottoms 224 define a plurality of leach openings 230, a plurality of mounting openings 232 and at least one retention tab 234, wherein the at least one retention tab 234 may include a first tab 236 and a second tab 238. It should be appreciated that the first tab 236 is located on the arch-curving side 228 of one side of the valley 220 and the second tab 238 is located on the arch-curving side 228 of the other side of the valley 220, wherein both the first tab 236 and the second tab 238 are located proximate the first and second base flanges 208, 210. It should be appreciated that the chamber structure 201 further defines one or more tab slots 229 in the corrugated sidewalls 225, wherein the one or more tab slots 229 may be located proximate the valley bottom 224 and the valley side 228.

The leaching chamber 200 further includes a louver article 240 having a louver article base 242 and a louver article wall 244, wherein the louver article base 242 includes a louver article base front 246, a louver article base rear 248, a louver article base top 250, a louver article base first support 252, a louver article base second support 254 and a louver article base wall 256. The louver article wall 244 includes a louver article wall top 258, a louver article wall bottom 260, a louver article wall rear 262, a louver article wall front 264, louver article wall sides 266 and a louver article wall width WW. It should be appreciated that the louver article wall width WW is larger proximate the louver article wall top 258 than the louver article wall width WW proximate the louver article wall bottom 260.

Referring to FIG. 17, FIG. 18, FIG. 19 and FIG. 20A-C, it should be appreciated that the louver article wall 244 defines a plurality of slot openings 268 which communicate the louver article wall front 264 with the louver article wall rear 262, wherein each of the plurality of slot openings 268 include a slot opening width SW and a slot opening height SH and a slot opening depth SD, wherein the slot opening width SW is larger than the slot opening height SH. It should be appreciated that the louver article wall 244 may be curved between the louver article wall top 258 and the louver article wall bottom 260 to approximate at least a portion of the curvature of the arch shaped chamber first side wall 204 and the arch shaped chamber second side wall 206. The plurality of slot openings 268 are arranged as a plurality of slot rows 270 that extend at least partially between the louver article wall sides 266 and between the louver article wall top 158 and the louver article wall bottom 160, wherein the plurality of slot rows 270 include a top slot row 272 and a bottom slot row 274, wherein the top slot row 272 may be located proximate the louver article wall top 258 and wherein the plurality of slot rows 270 extend at least partial down the louver article wall 244. Additionally, the louver article wall 244 includes a plurality of louver article wall spines 276 which extends at least partially between the louver article wall top 150 and the louver article wall bottom 160. In this embodiment, there are two (2) louver article wall spines 276, which divide the plurality of slot rows 270 into three (3) columns, wherein each of the louver article wall spines 276 includes a louver article wall spine top 278. It should be appreciated that the louver article wall spine top 278 includes louver article mounting structure 280, wherein the louver article mounting article structure 280 extends outwardly from the louver article wall rear 262 and includes a mounting article shank portion 282 and a mounting article hook portion 284.

Figure 20A:
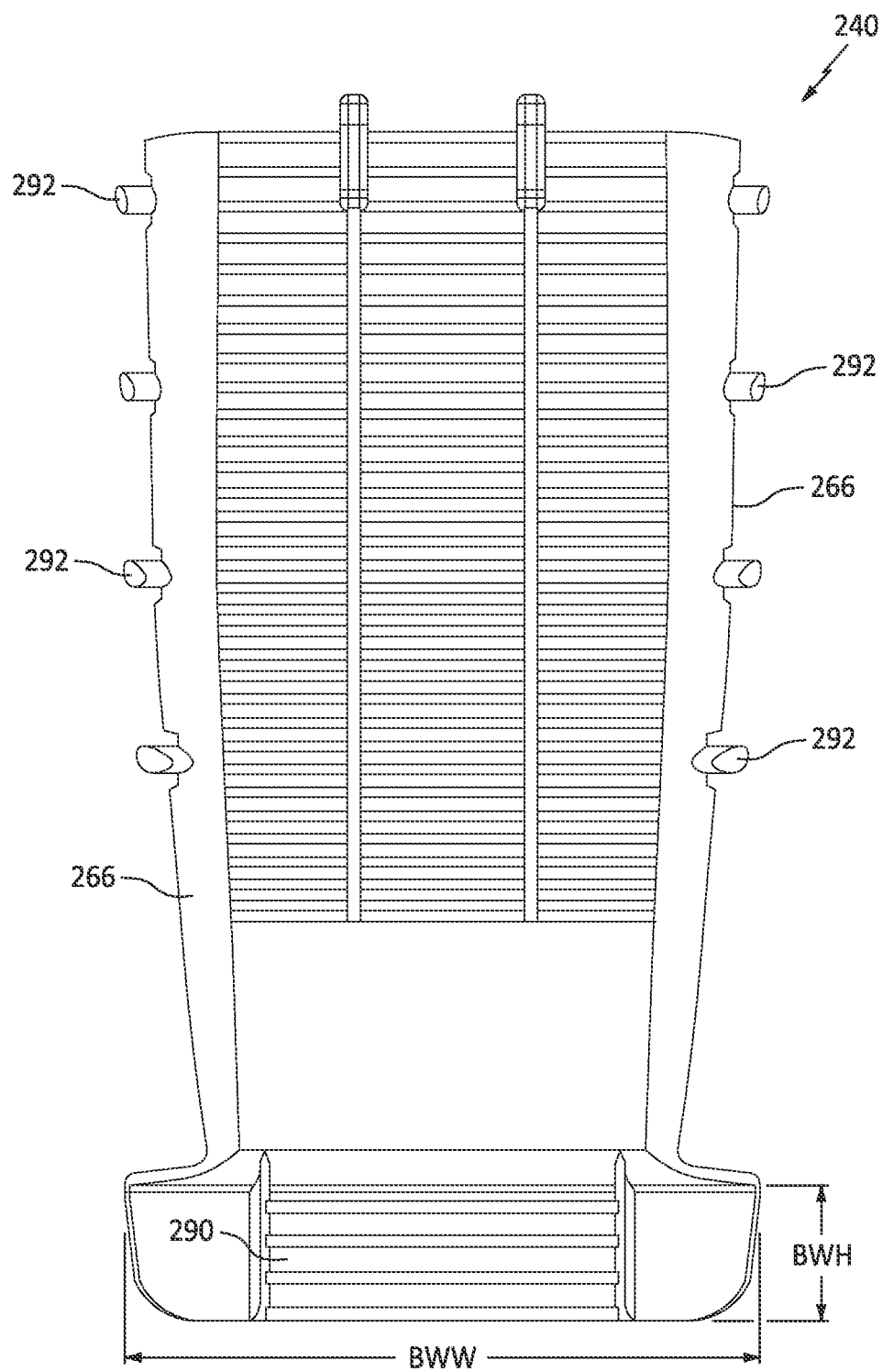
FIG. 20A is a rear view of the louver article of FIG. 17.
Figure 20B:
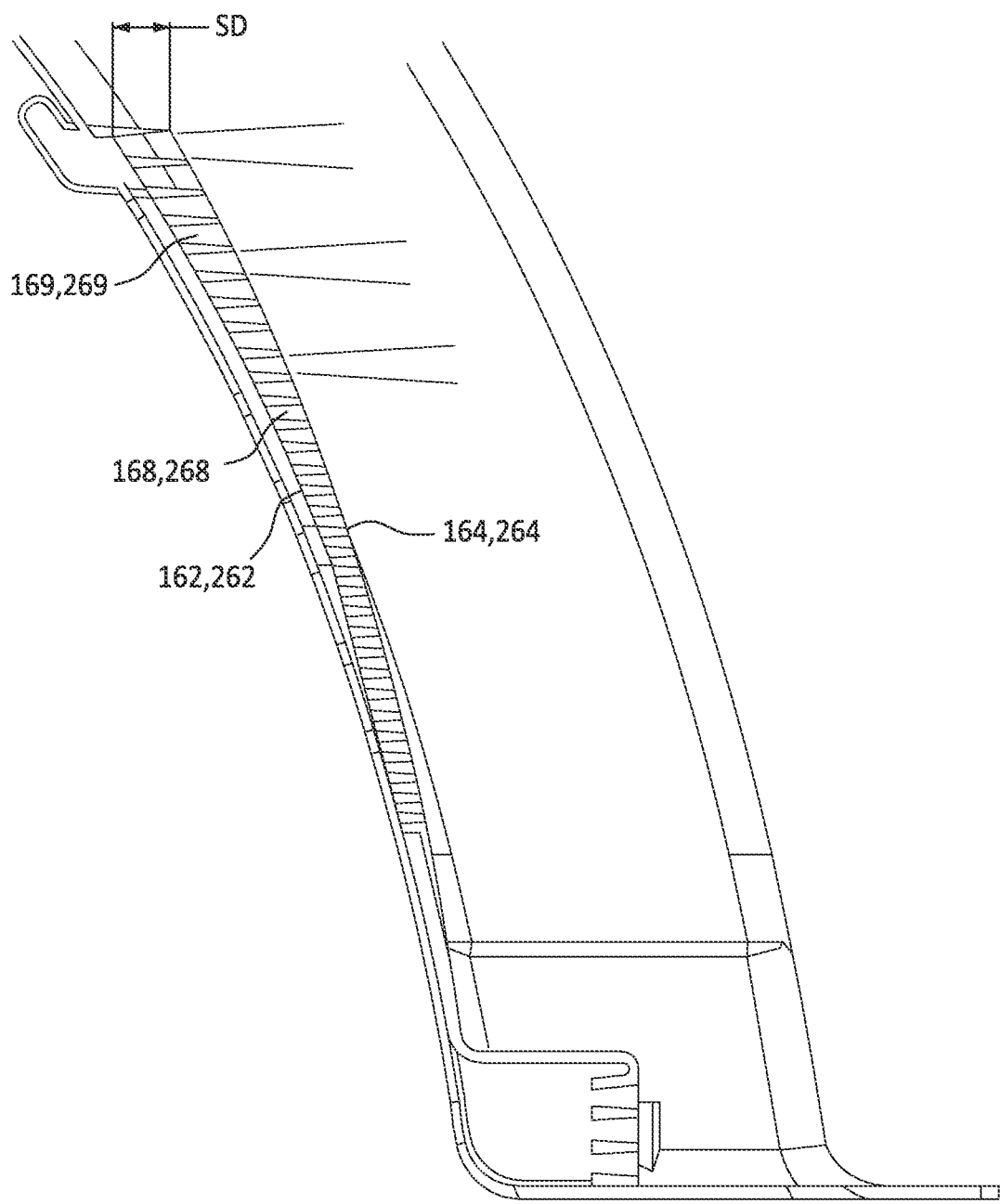
FIG. 20B is a side sectional view of the louver article of FIG. 17 associated with the valley of the leaching chamber of FIG. 12A, in accordance with one embodiment of the invention.
Figure 21:
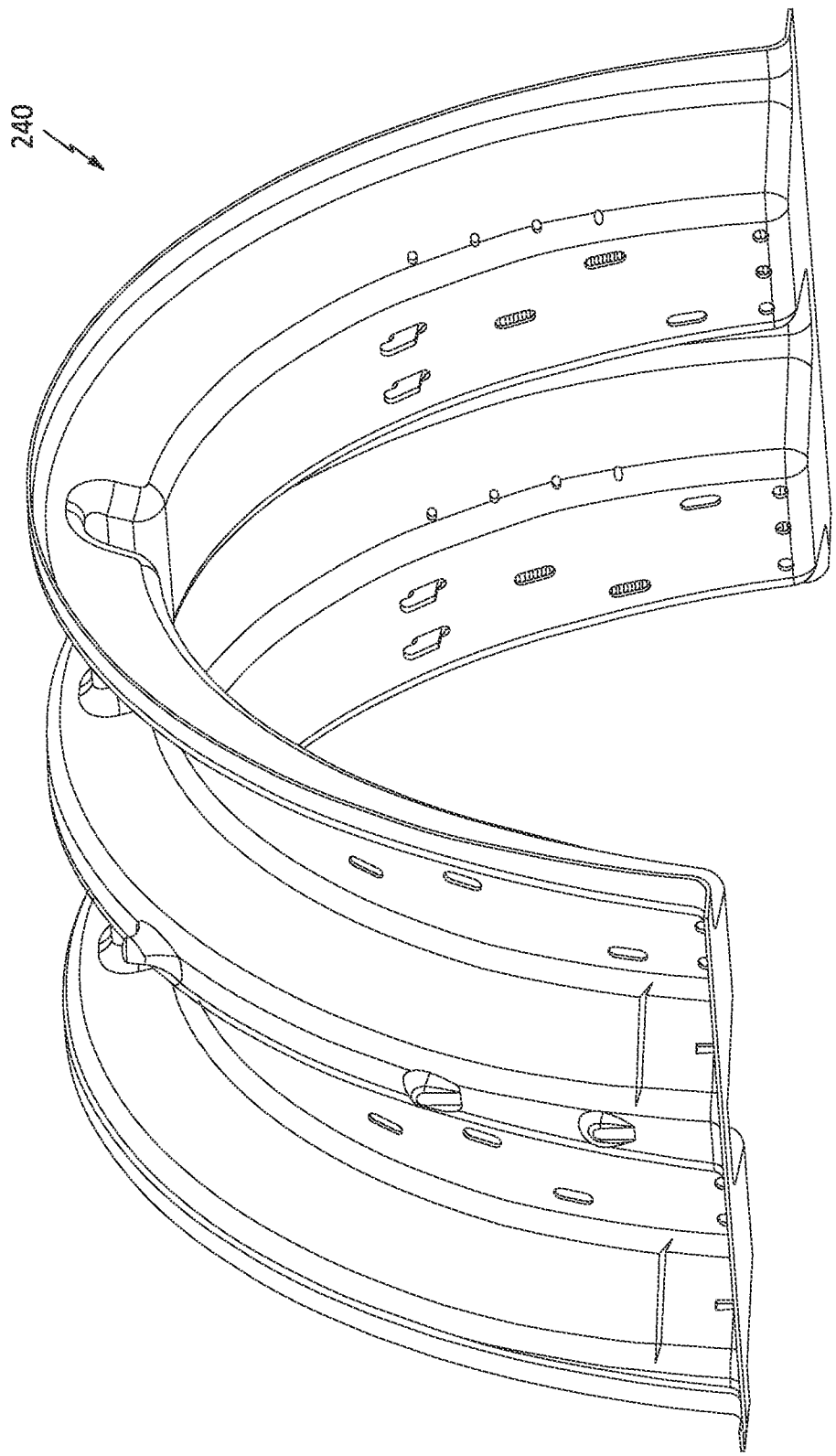
FIG. 21 is a front side isometric view of the leaching chamber section of FIG. 12A showing the inside wall of the valleys with the louver article of FIG. 17 associated, in accordance with another embodiment of the invention.

Referring to FIG. 20B, one embodiment of the louver article 240 is shown having the louver article wall 244 which includes the plurality of slot openings 268, wherein the plurality of slot openings 268 traverse the thickness SD of the louver article wall 244 to communicate the louver article wall front 264 with the louver article wall rear 262. It should be appreciated that the slot opening height SH located proximate the louver article wall front 264 is larger than the slot opening height SH located proximate the louver article wall rear 262. Moreover, the slot opening height SH of the slot openings 268 that are located proximate the louver article wall top 258 are larger than the slot opening height SH of the slot openings 268 that are located proximate the louver article wall bottom 260. Additionally, referring to FIG. 20C, one embodiment of the louver article 240 is shown and includes two louver article wall spines 276 which extends between the louver article wall top 258 and the louver article wall bottom 260 and which divides the plurality of slot openings 268 into two (2) side columns 271 and one (1) center column 273. It should be appreciated that the slot opening widths SW of the slot openings 268 in side columns 271 located proximate the louver article wall top 258 are larger than the slot opening widths SW of the slot openings 268 in side columns 271 located proximate the louver article wall bottom 260. FIG. 20C illustrates example sizes of slot opening widths SW showing that they decrease in size from the louver article wall top 258 to the louver article wall bottom 260. Moreover, it should be further appreciated that the louver article 240 is located relative to the chamber structure 201 such that at least a portion of the louver article wall rear 260 is spaced apart from the chamber structure 201 by predefined distance.

It should be further appreciated that the louver article base wall 256 includes a louver article base wall front 286, a louver article base wall rear 288, a louver article base wall height BWH and a louver article base wall width BWW. Additionally, the louver article base wall 256 may define a plurality of base front slot openings 290 which extend across the louver article base wall 256 and which communicate the louver article base wall front 286 with the louver article base wall rear 288. Moreover, the louver article 240 includes one or more tabs 292 located on the outer surface of the louver article wall sides 266 such that the tabs 292 extend out of the outer surface of the louver article wall sides 266. Thus, when the louver article 240 is securely associated with the leaching chamber 200, the one or more tabs 292 are located within the one or more tab slots 229. It should be appreciated that the louver article base top 250, louver article base first support 252, louver article base second support 254 and louver article base wall 256 define a louver article cavity 261 which is located between the louver article base wall 256 and the chamber structure 201 such that the base front slot openings 290 are separated from the chamber structure 201 by the louver article cavity 261.

It should be appreciated that the louver article 240 may be securely associated with the leaching chamber 200 by disposing the louver article 240 within valleys 220 using a 'snap-fit' configuration such that each of the louver article mounting structures 280 are located within one of the plurality of mounting openings 232. The louver article mounting structures 280 will then be protruding out from the inner surface of the wall of the valley 220 and into the chamber cavity 212. It should be appreciated that the mounting article shank portion 282 and the mounting article hook portion 284 will limit movement of the louver article wall 244 upwardly along the wall of the valley 220 and laterally outward from the wall of the valley 220. Additionally, the louver article base wall 256 may be disposed proximate the chamber base flange 208, 210 associated with the specific valley 220 to be located behind the first tab 236 and the second tab 238 and to be disposed between the first tab 236 and the second tab 238 and the wall of the valley 220. It should be appreciated that the first tab 236 and the second tab 238 will prevent the louver article base 242 from moving laterally and outwardly away from the wall of the valley 220. Moreover, each of the tabs 292 will be snugly contained within a tab slot 229 to provide for a secure association of the louver article 240 with the leaching chamber 200. It should be appreciated that in one embodiment, one or more of the tab slots 229 may be a through-hole thereby traversing the thickness of the chamber structure 201, while in another embodiment, one or more of the tab slots 229 may be a depression and may not traverse the thickness of the chamber structure 201.

It should be appreciated that the plurality of leach openings 230 are located to be communicated with the plurality of slot openings 268 and the plurality of base front slot openings 290. This advantageously allows liquid contained with the chamber cavity 212 to leach out of the plurality of leach openings 230, through the plurality of slot openings 268 and the plurality of base front slot openings 290 and into the surrounding soil. It should be further appreciated that the leaching chamber 200 may be constructed from a Polyethylene terephthalate, or PET, material, while the louver article may be constructed from a Polyethylene (PE) and/or a Polypropylene (PP) material to take advantage of the unique benefits of the PET material and the unique benefits of the PE and/or PP material.

It should be further appreciated that the louver article 140 may be securely associated with the leaching chamber 100, 200 such that the louver article 140 may be a predefined distance from the valley bottom 124, 224 to allow for liquids to flow through the leach opening(s) 130, 230 and the plurality of slot openings 168, 268. This predefined distance is sized to allow liquid to build up between the valley bottom 124, 224 and the louver article 140, 240 and thus, leach out of the slot openings 168, 268 much more efficiently.

Referring to FIG. 22, FIG. 23, FIG. 24 and FIG. 25, a PET leaching chamber 300 having sidewall openings with louvers is provided, wherein the louvers are over-molded with the leaching chamber 300 via an over-molding process, in accordance with an additional embodiment of the invention. It should be appreciated that generally over-molding involves introducing a heated material (such as PE or PP) into a mold which contains a substrate that was previously molded (such as a PET substrate shaped as a leaching chamber) to form a structure (such as a louver article structure) that bonds with the substrate within the mold to form a component (such as a PET leaching chamber having louvers). In this embodiment, the leaching chamber 300 may be molded out of a PET material by introducing a heated PET material into a mold to create a PET chamber structure or substrate 301 that is shaped like a corrugated leaching chamber having alternating peaks 318 and valleys 320, wherein the substrate 301 also includes leaching openings 330 located in the alternating valleys 320 and/or alternating peaks 318. A heated PE and/or PP material may then be introduced into the mold to form a louver article 340 having louver slot openings 368 which bonds with (i.e. 'over-molds') the PET substrate 301 such that the louver slot openings 368 are located proximate to and cover the leaching openings 330 in the alternating peaks 318 and/or valleys 320. It should be appreciated that, in one embodiment, the louver article 340 may be attached to the PET substrate 301 via a mechanical bond, such as a post and hole configuration (i.e. molded posts in holes) and may not be chemically bonded. For example, in one embodiment the louver article 340 may include one or more tabs 392 that have a tab head 393, wherein the one or more tabs 392 protrude out of the louver article 340 and through the tab slots 329 such that the tab head 393 is located on the inside of the substrate 301 to be within the chamber cavity 312. The tab head 393 is sized and shaped such that the tab head 393 does not fit through the tab slots 329, thereby securely anchoring the louver article 340 to the substrate 301.

Figure 26:
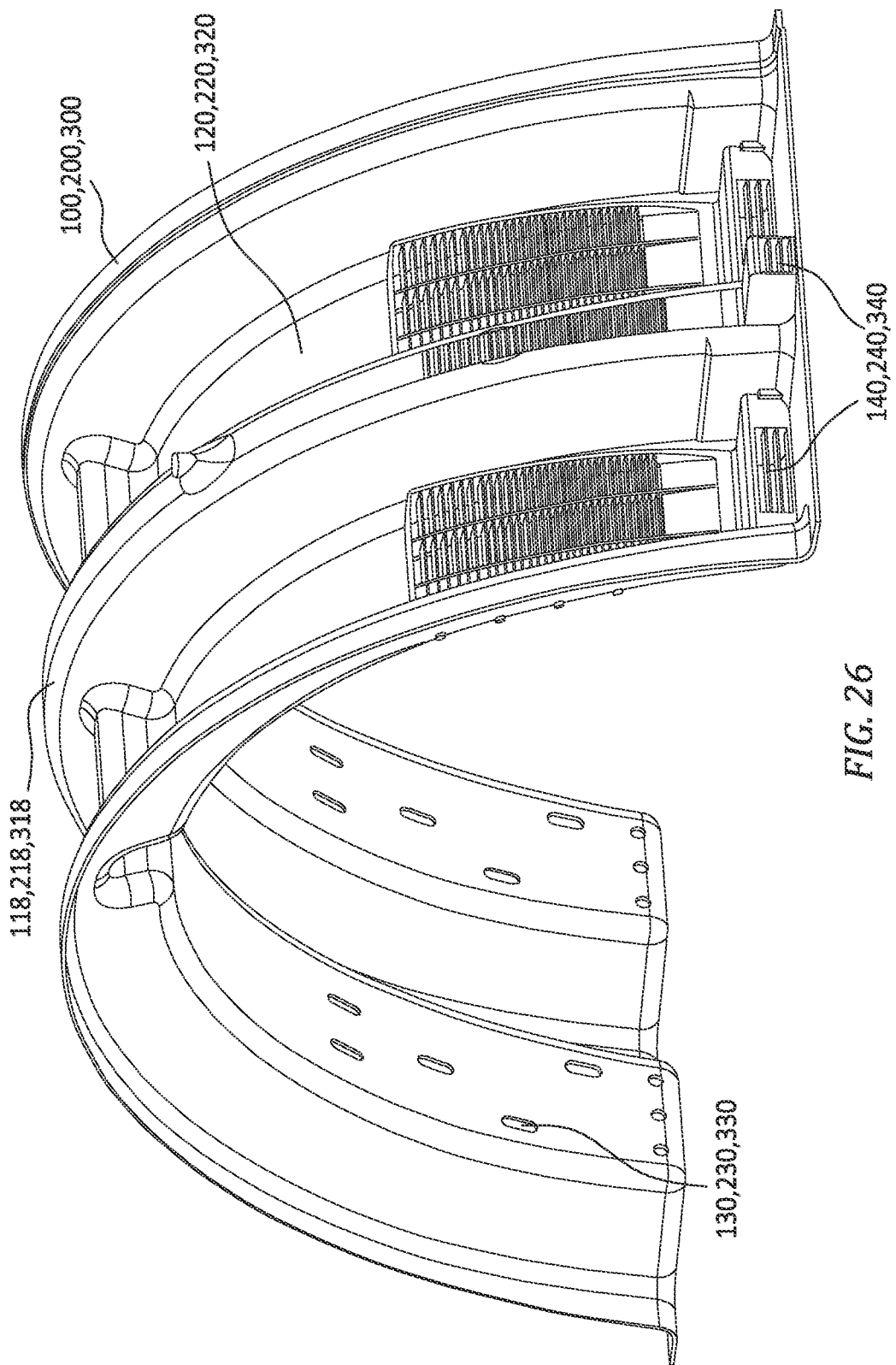
FIG. 26 is a front side view of a section of a leaching chamber having over-molded louver articles in the peaks and the valleys of the chamber substrate, in accordance with another embodiment of the invention.
Figure 27:
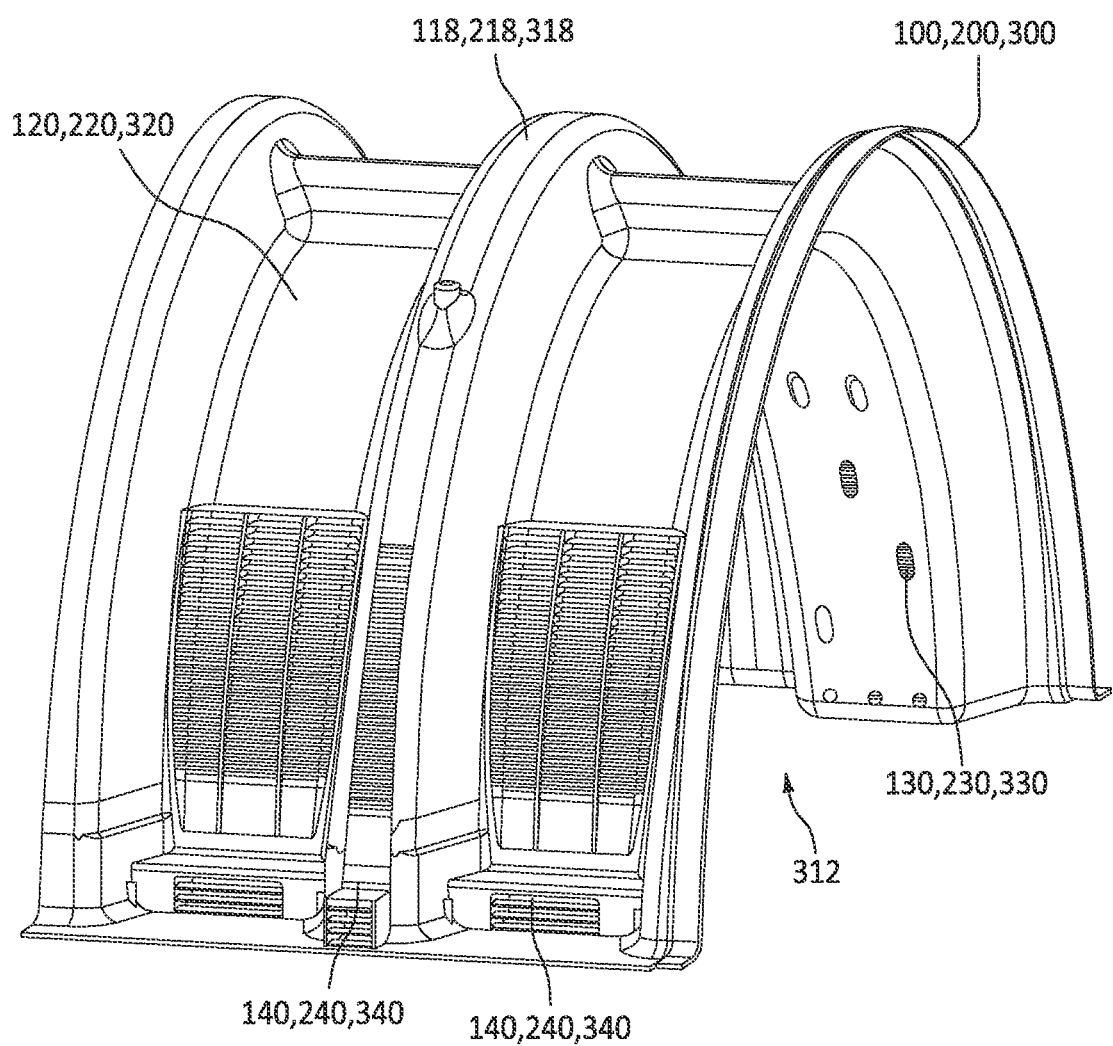
FIG. 27 is a side view of the leaching chamber section of FIG. 26.

Referring again to the FIG. 26 and FIG. 27, it is contemplated that in at least one embodiment, the chambers 100, 200, 300 may include leaching openings 130, 230, 330 in the peaks 118, 218, 318, the valleys 120, 220, 320 and/or the peaks 118, 218, 318 and valleys 120, 220, 320. Thus, the chambers 100, 200, 300 may include louver articles 140, 240, 340 in the peaks 118, 218, 318 and/or the valleys 120, 220, 320 to cover the leaching openings 130, 230, 330.

Figure 22:
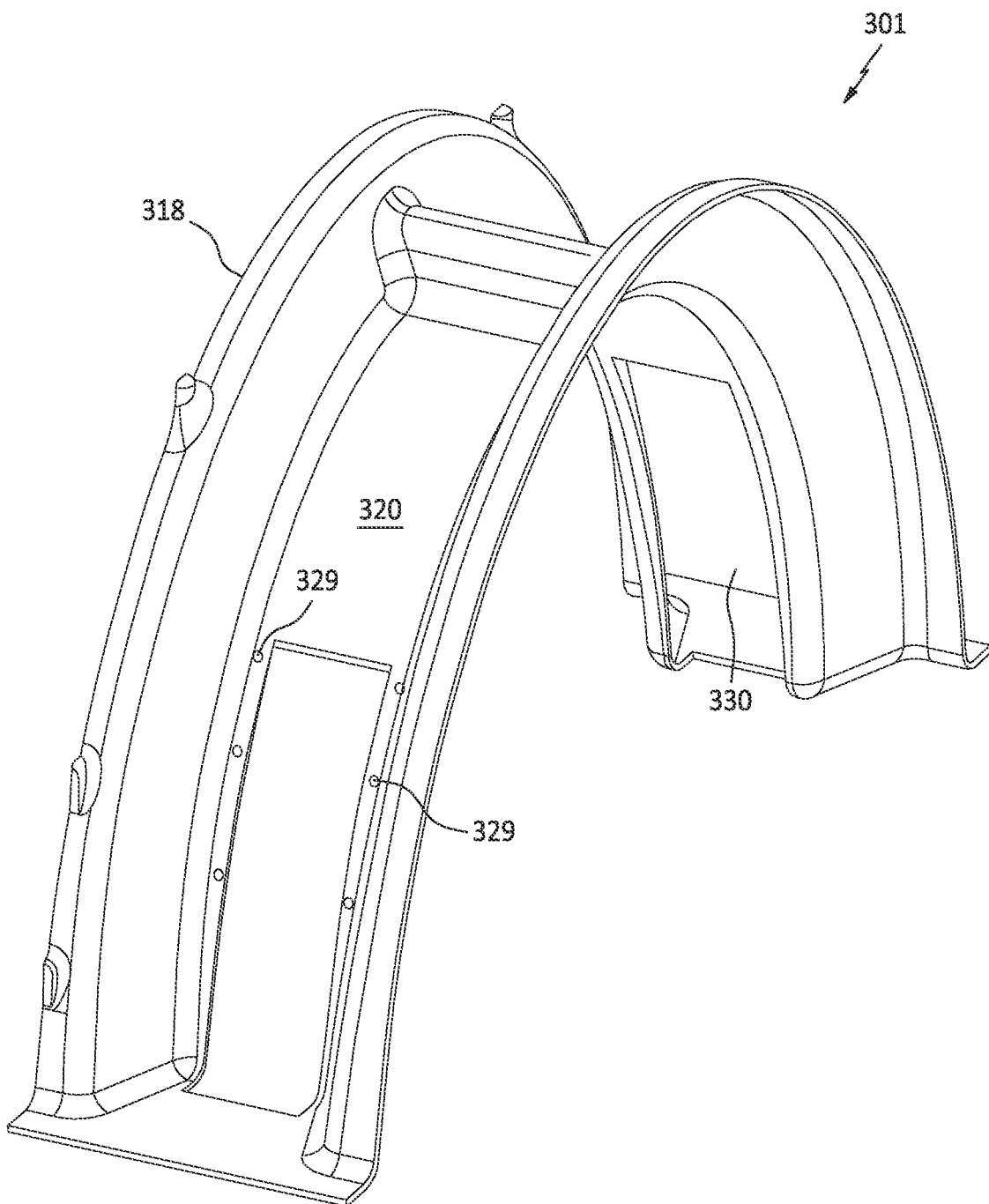
FIG. 22 is a front side view of a section of a leaching chamber substrate having leaching openings, in accordance with another embodiment of the invention.
Figure 28:
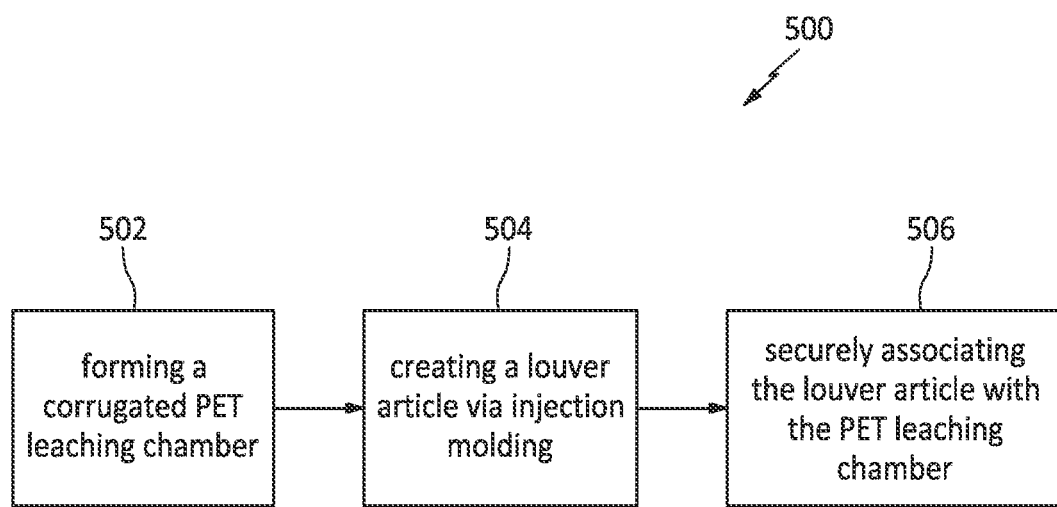
FIG. 28 is an operational block diagram illustrating a method for fabricating a PET leaching chamber having sidewalls with louvers, in accordance with another embodiment of the invention.

It should be appreciated that methods for molding leaching chambers out of PET material which may be applied to the chambers 100, 200, 300 of the present invention are described in U.S. Pat. No. 9,809,968, the contents of which are incorporated herein by reference in its entirety. Referring to FIG. 22 28, a method 500 for fabricating a leaching chamber 100, 200 having sidewalls with louvers is shown, in accordance with one embodiment of the invention, and includes forming a corrugated polyethylene terephthalate (PET) leaching chamber 100, 200 having an arch shape cross section via at least one forming method, as shown in operational block 502. It should be appreciated that the at least one forming method includes at least one of an injection molding forming method and a thermoforming forming method. The louver article 140, 240 is then created via injection molding, as shown in operational block 504, wherein the louver article 140, 240 is constructed from at least one of a polyethylene (PE) and/or a polypropylene (PP) material. The louver article 140, 240 is then securely associated with the leaching chamber 100, 200 such that the louver article 140, 240 is located adjacent the leaching opening(s) 130, 230, as shown in operational block 506. It should be appreciated that the louver article 140, 240 may be associated with the leaching chamber 100, 200 in a 'snap fit' fashion via a secondary operation as discussed hereinbefore. Moreover, it is contemplated that in other embodiments the louver article 140, 240 may be associated with the leaching chamber 100, 200 via any method and/or device suitable to the desired end purpose, such as friction, screws, clips, etc.

Figure 23:
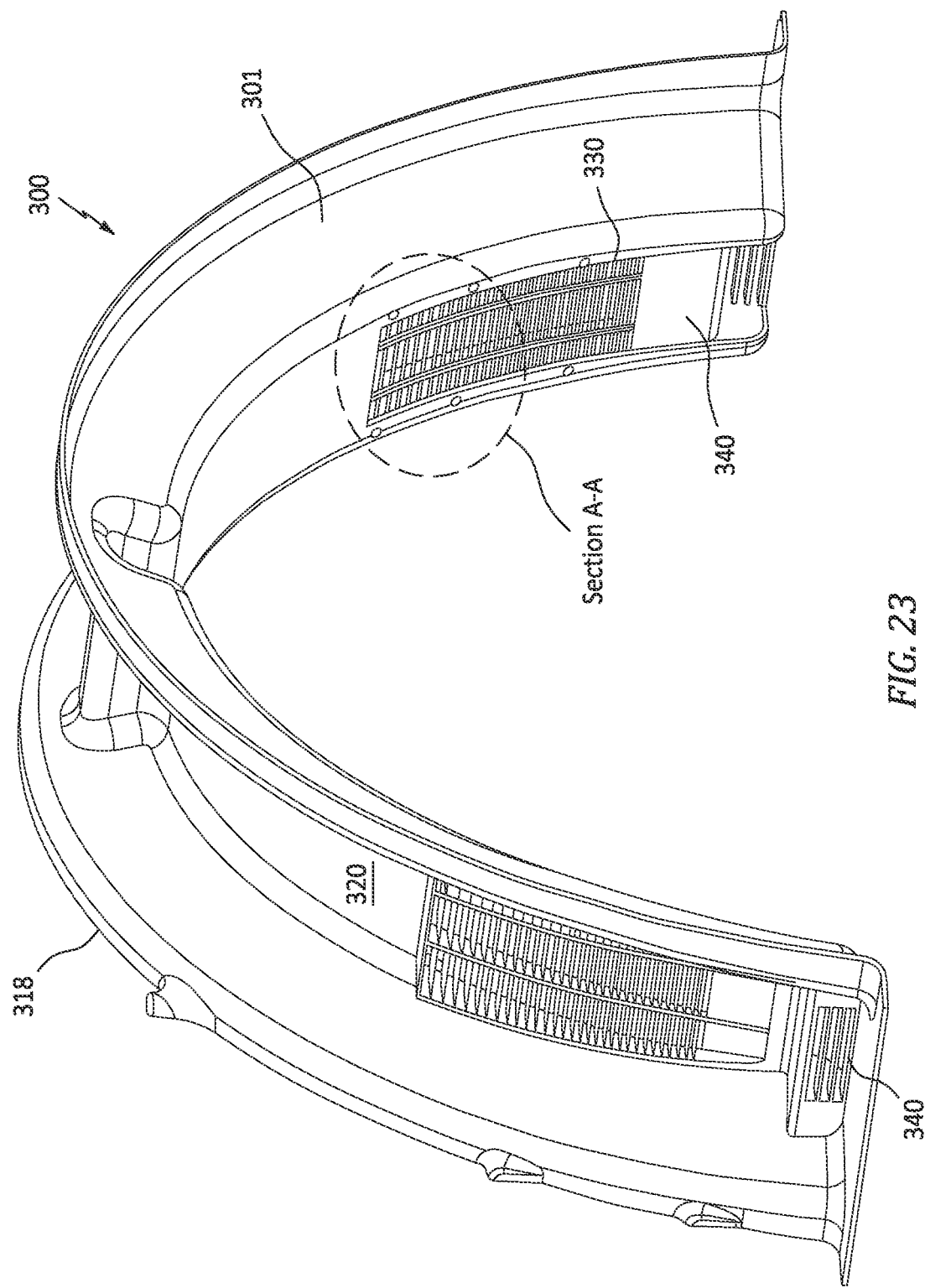
FIG. 23 is a front side view of the section of the leaching chamber substrate of FIG. 22 having an over-molded louver article, in accordance with another embodiment of the invention.
Figure 24:
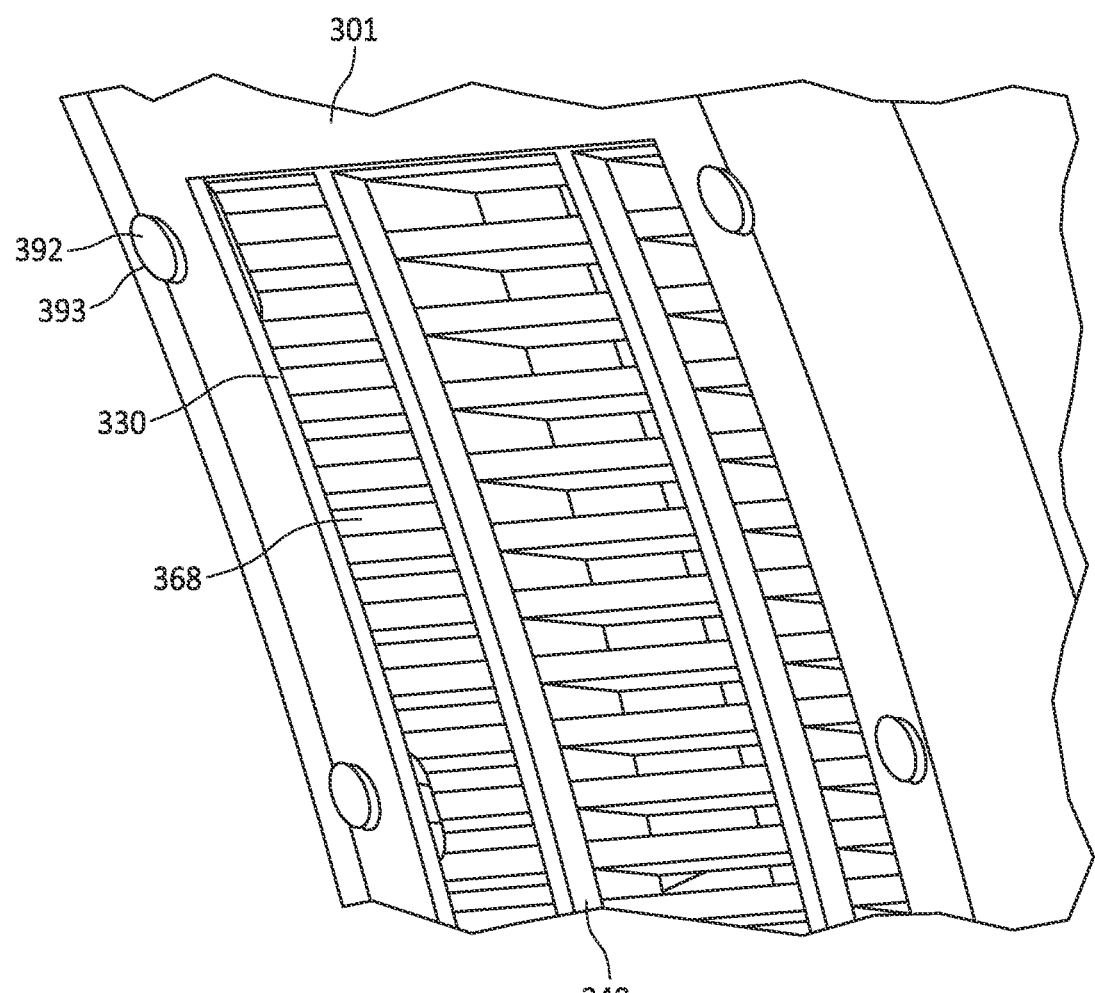
FIG. 24 is a close-up view of a portion of the leaching chamber section of FIG. 23, in accordance with one embodiment of the invention.
Figure 25:
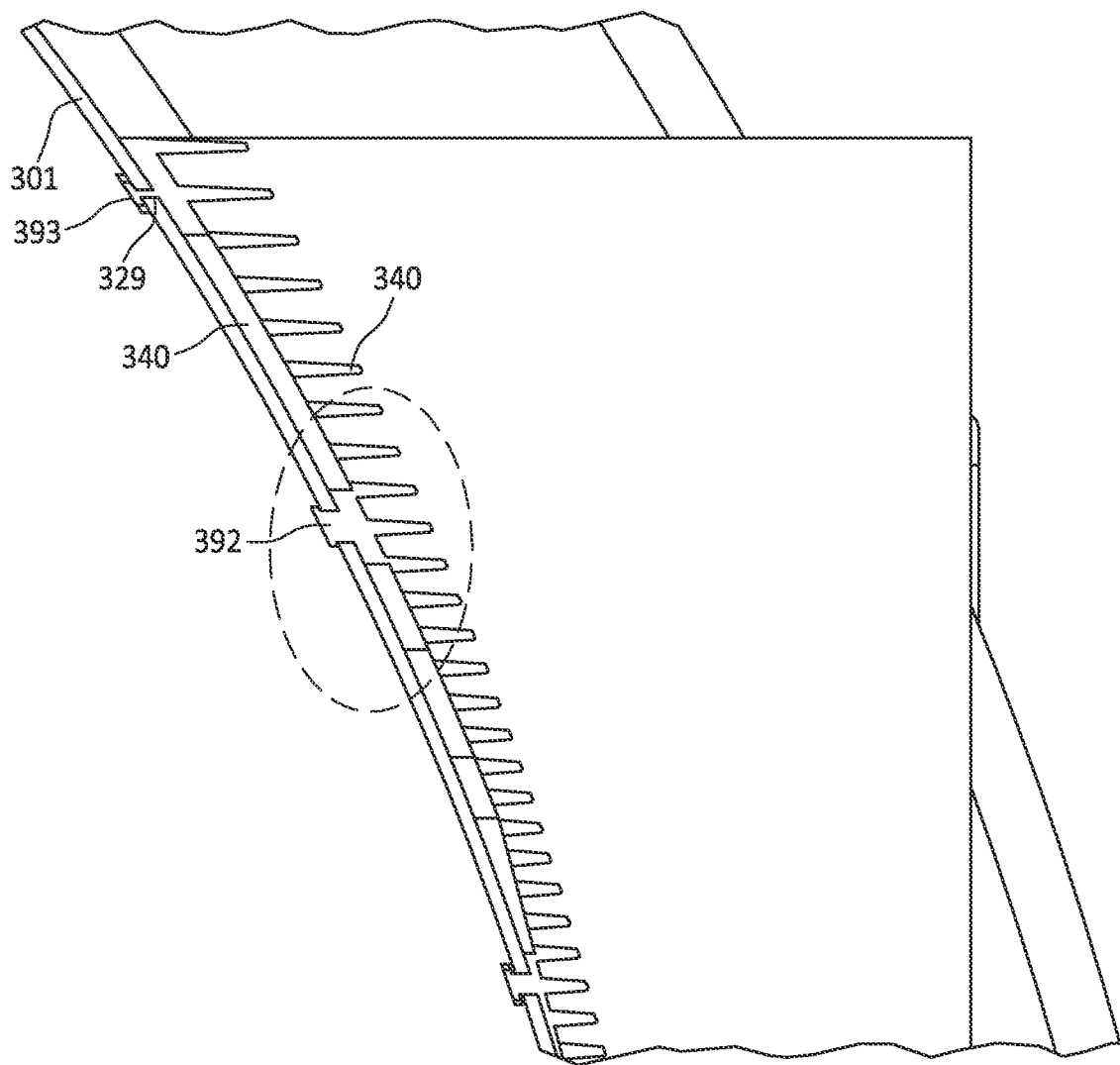
FIG. 25 is a side sectional view of a louver article being over-molded with a leaching chamber substrate, in accordance with another embodiment of the invention.
Figure 29:
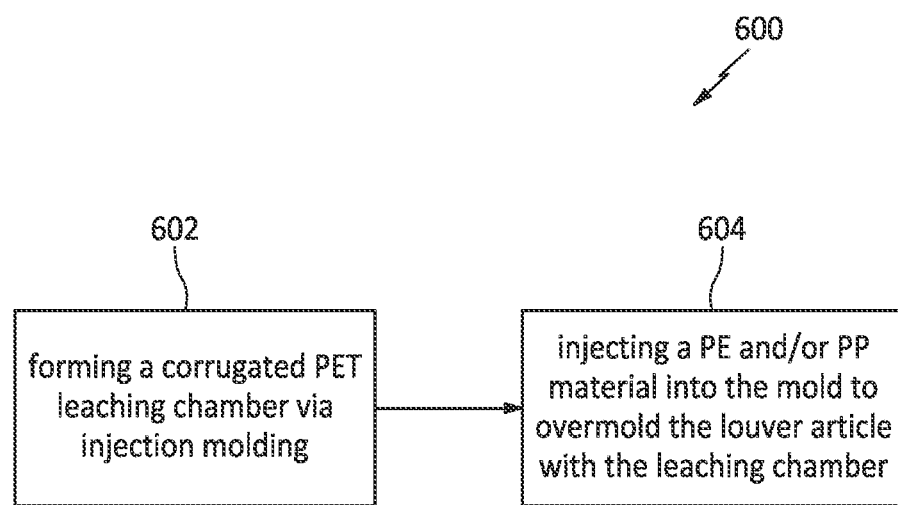
FIG. 29 is an operational block diagram illustrating a method for over-molding a PET leaching chamber having sidewalls with louvers, in accordance with another embodiment of the invention.
Figure 30:
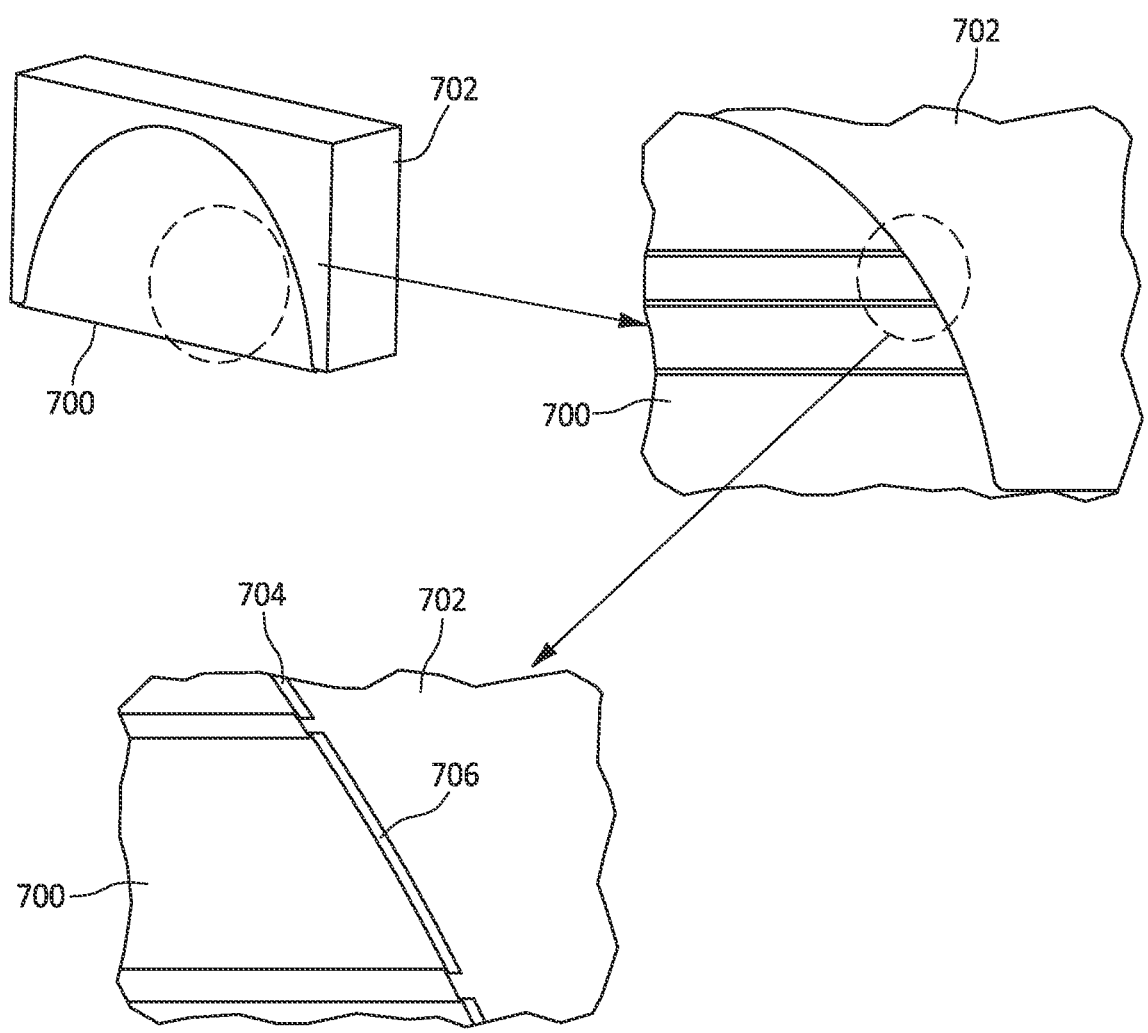
FIG. 30 shows sectional views of a section of a mold core and a first mold cavity of an injection molding machine for implementing the method of FIG. 29, in accordance with one embodiment of the invention.
Figure 31:
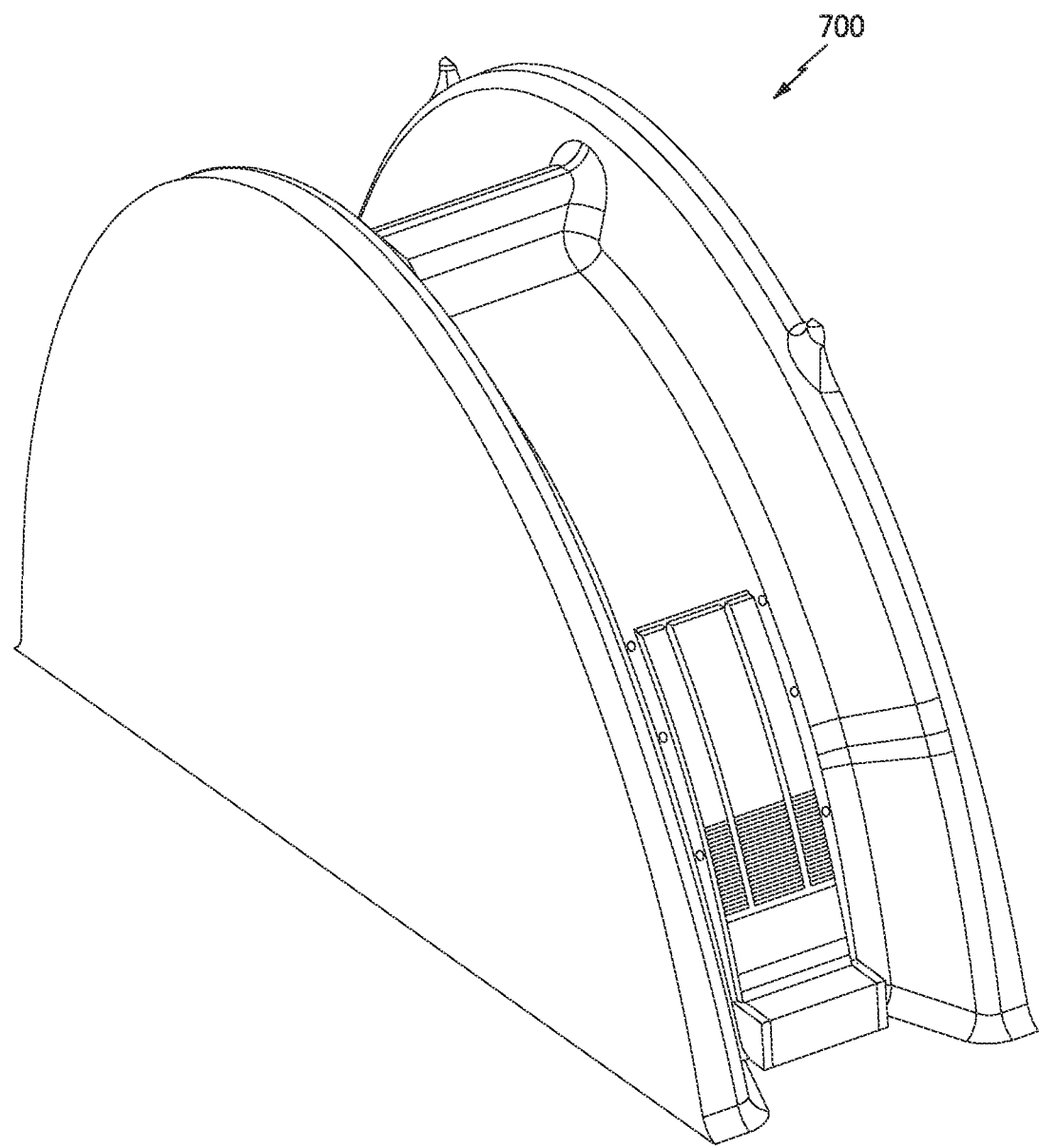
FIG. 31 shows a section of the mold core of FIG. 30.
Figure 32:
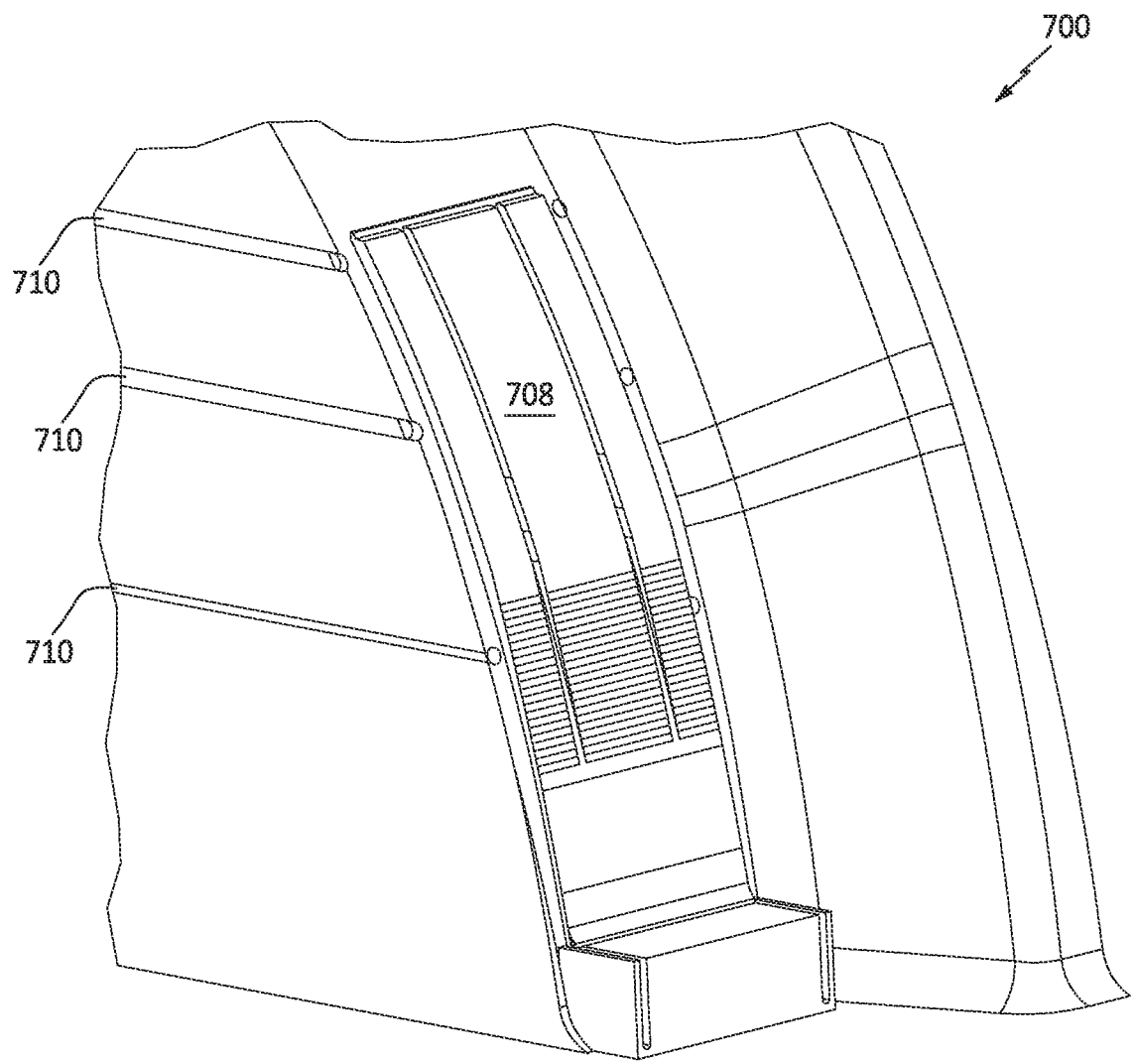
FIG. 32 shows a section of the mold core of FIG. 30.
Figure 33:
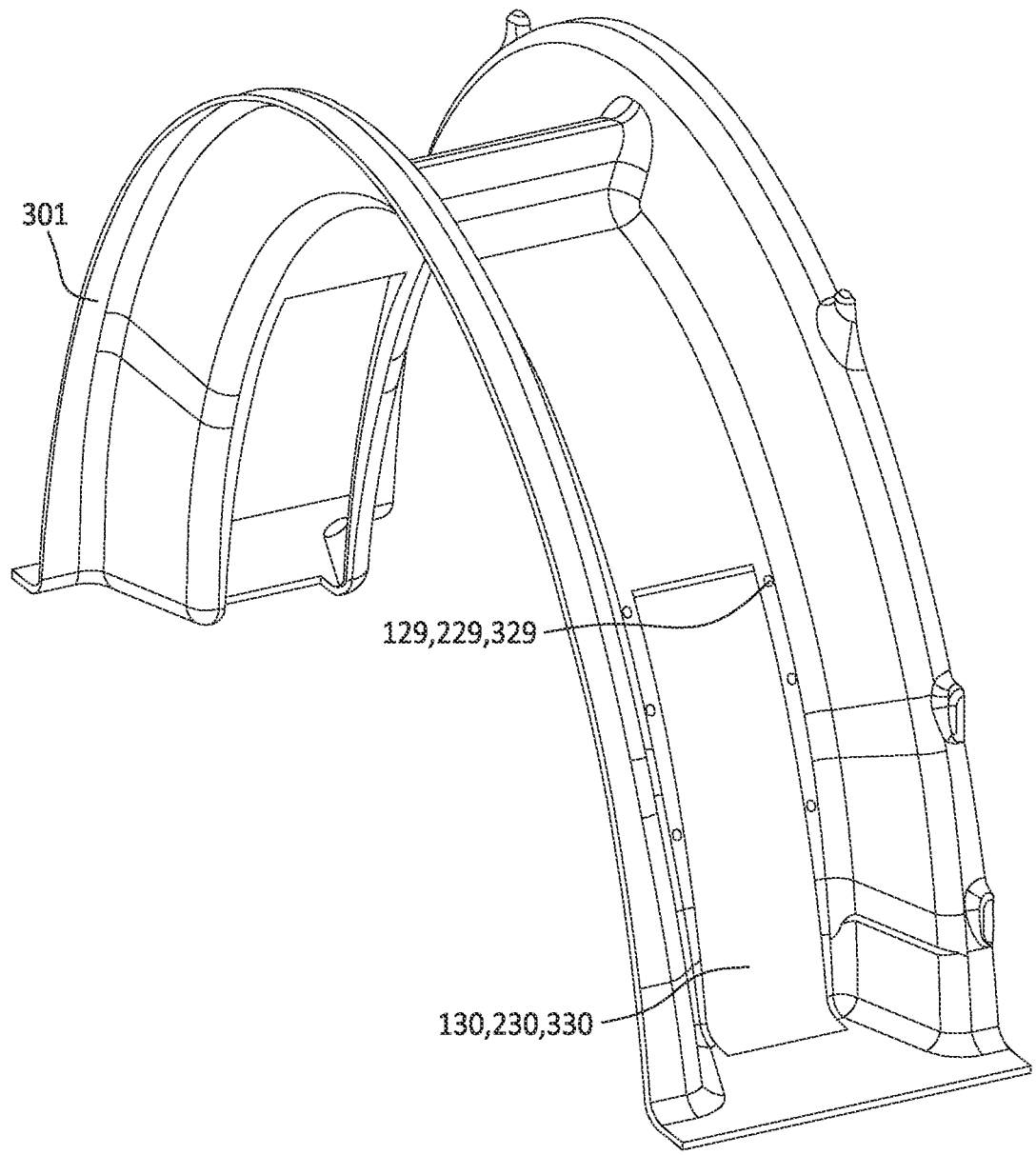
FIG. 33 shows a section of a substrate (without the louver article) molded using the method of FIG. 29 with the mold core and first mold cavity of FIG. 29, in accordance with one embodiment of the invention.
Figure 34:
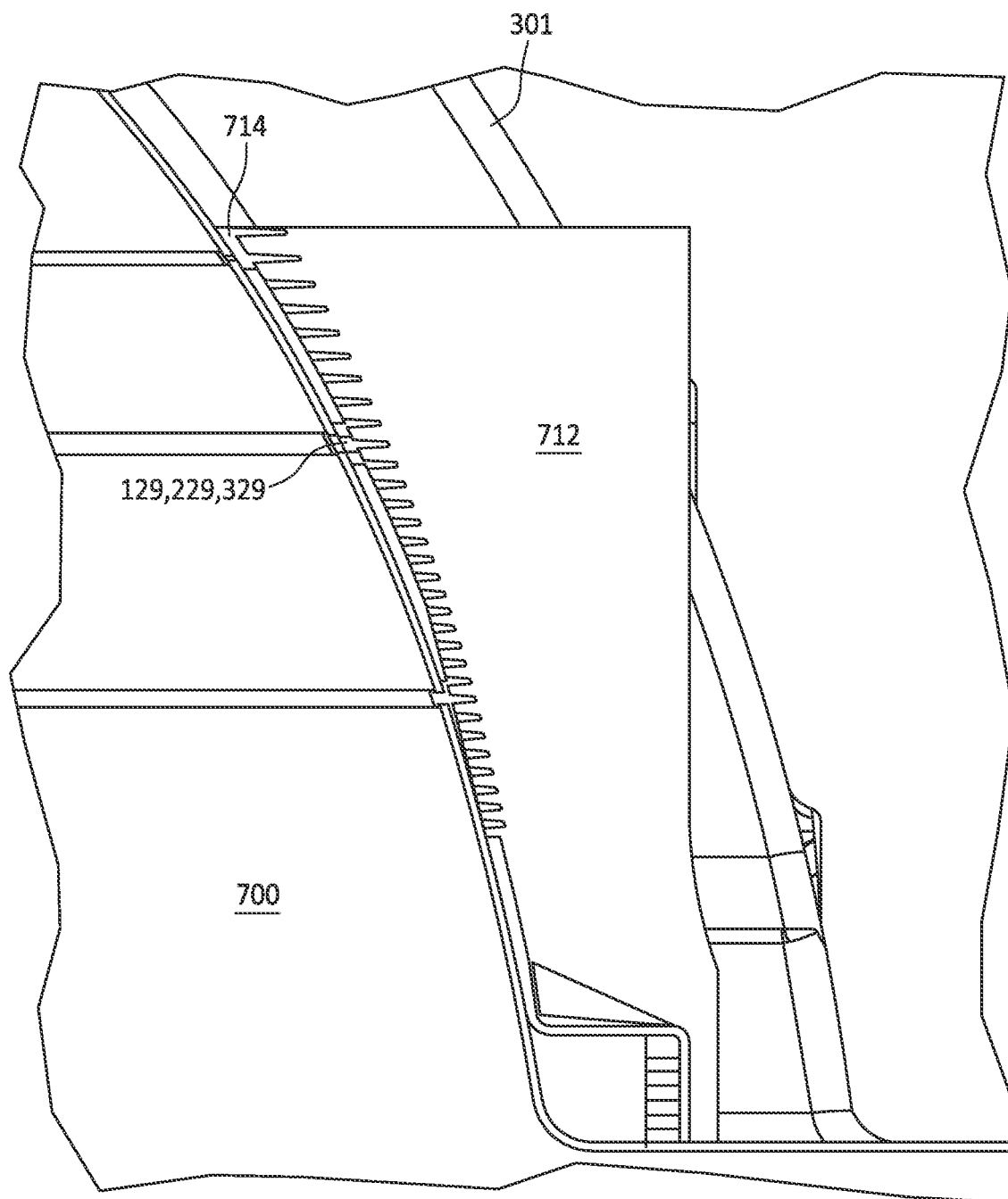
FIG. 34 is a side sectional view of the mold core FIG. 29 and a second mold cavity for over-molding the louver article with the substrate of FIG. 33, in accordance with one embodiment of the invention.
Figure 35:
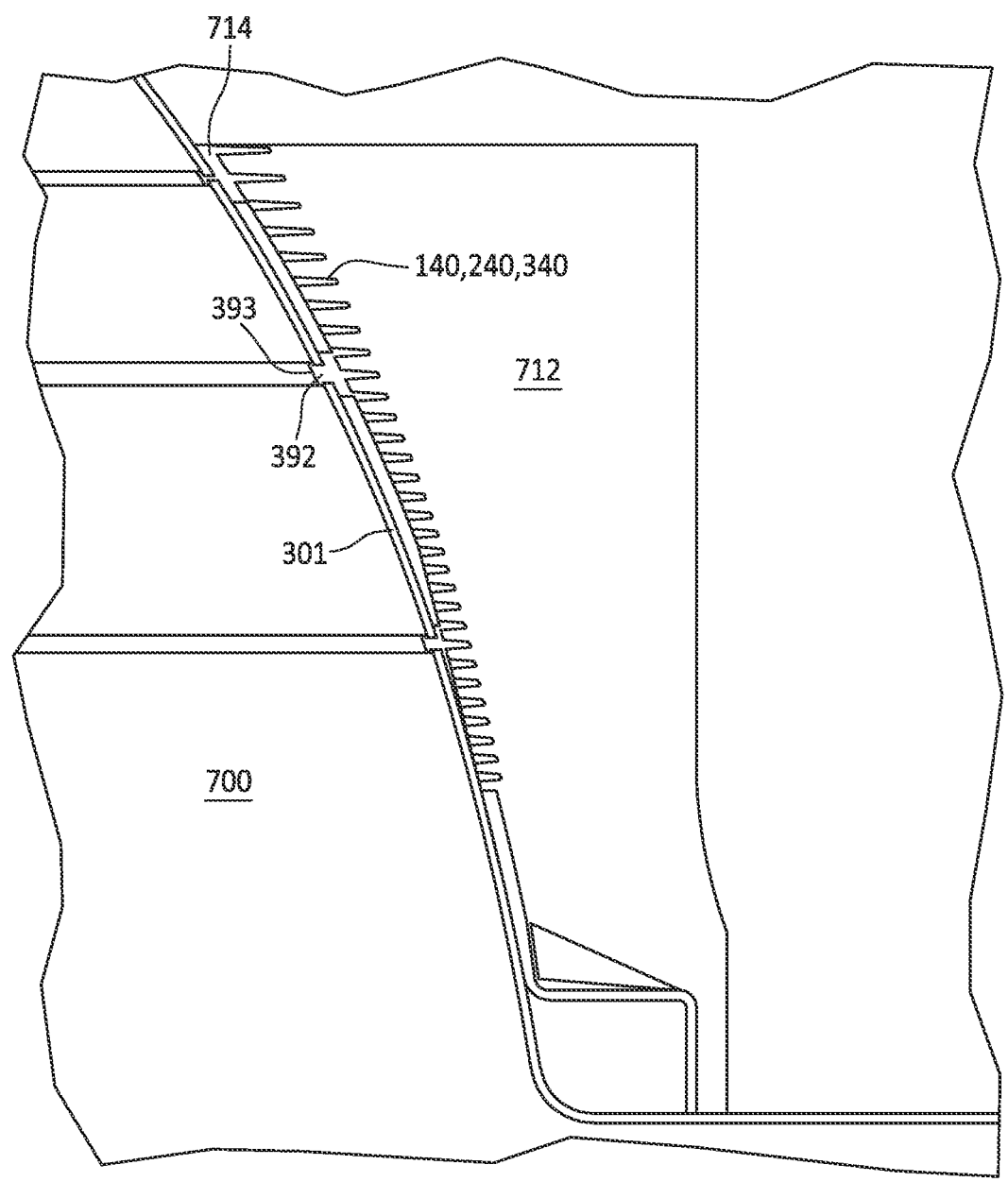
FIG. 35 is a side sectional view of the mold core FIG. 29 and a second mold cavity for over-molding the louver article with the substrate of FIG. 33, in accordance with one embodiment of the invention.

Referring to FIG. 23 29, a method 600 for fabricating a leaching chamber 300 having sidewalls with leaching openings 130, 230, 330 and with louvers covering the leaching openings 130, 230, 330 is shown in accordance with another embodiment of the invention is shown and includes operating a mold to form a corrugated polyethylene terephthalate (PET) leaching chamber 300 having an arch shape cross section with alternating peaks and valleys with leaching openings 130, 230, 330 located in the sidewalls in the alternating valleys 120, 220, 320 and/or alternating peaks 118, 218, 318 as shown in operational block 602. Once the corrugated PET leaching chamber 300 is created, the method 600 further includes injecting a heated polyethylene (PE) and/or a polypropylene (PP) material into the mold to cause the louver article 140, 240, 340 to be over-molded with the leaching chamber 300, wherein the louver article 140, 240, 340 to be located proximate to and coving the leaching openings 130, 230, 330 in the sidewalls in the alternating peaks 118, 218, 318 and/or alternating valleys 120, 220, 320 to cover the leaching openings 130, 230, 330 and to form a mechanical bond between the leaching chamber 300 and the louver article 140, 240, 340, as shown in operational block 604. It should be appreciated that in another embodiment, method 600 may be accomplished by molding the PP/PE louver article 140, 240, 340 first and then molding the PET chamber structure 101, 201, 301 onto the louver article 140, 240, 340.

Referring to FIGS. 30-40, an example of the method 600 for fabricating a leaching chamber 300 having sidewalls with leaching openings 130, 230, 330 and with louvers covering the leaching openings 130, 230, 330 is shown in accordance with one embodiment of the invention. It should be appreciated that although this embodiment is discussed in terms of the leaching chamber substrate 301 being molded first and then the louver article 140, 240, 340 being over-molded to the leaching chamber substrate 301, it is contemplated that in another embodiment the louver article 140, 240, 340 may be molded first and then the leaching chamber substrate 301 being over-molded to the louver article 140, 240, 340. In accordance with one embodiment of the invention, the corrugated PET leaching chamber substrate 301 may be created via injection molding, as shown in operational block 602.

Referring again to FIG. 30, this may be accomplished by operating an injection molding machine, or injection press, having a mold core 700 and a first mold cavity 702. The mold core 700 and mold cavity 702 are configured to cooperate with each other such that when they are fit together a space 704 remains between the mold core 700 (which forms the inner surface of the leaching chamber substrate 301) and the mold cavity 702 (which forms the outer surface of the leaching chamber substrate 301) in the shape of the leaching chamber substrate 301. While the mold core 700 and mold cavity 702 are fit together, a PET material 706 is injected into the space 704 to fill the space 704 with PET material 706 and allowed to harden. The mold core 700 includes a core cutout 708 and core pins 710 which extend into the space 704 to create the leaching openings 130, 230, 330 and tab slots 129, 229, 329 respectively, in the leaching chamber substrate 301. Once the PET material 706 is hardened, the core pins 710 are retracted and the first mold cavity 702 is disassociated from the mold core 700.

Figure 36:
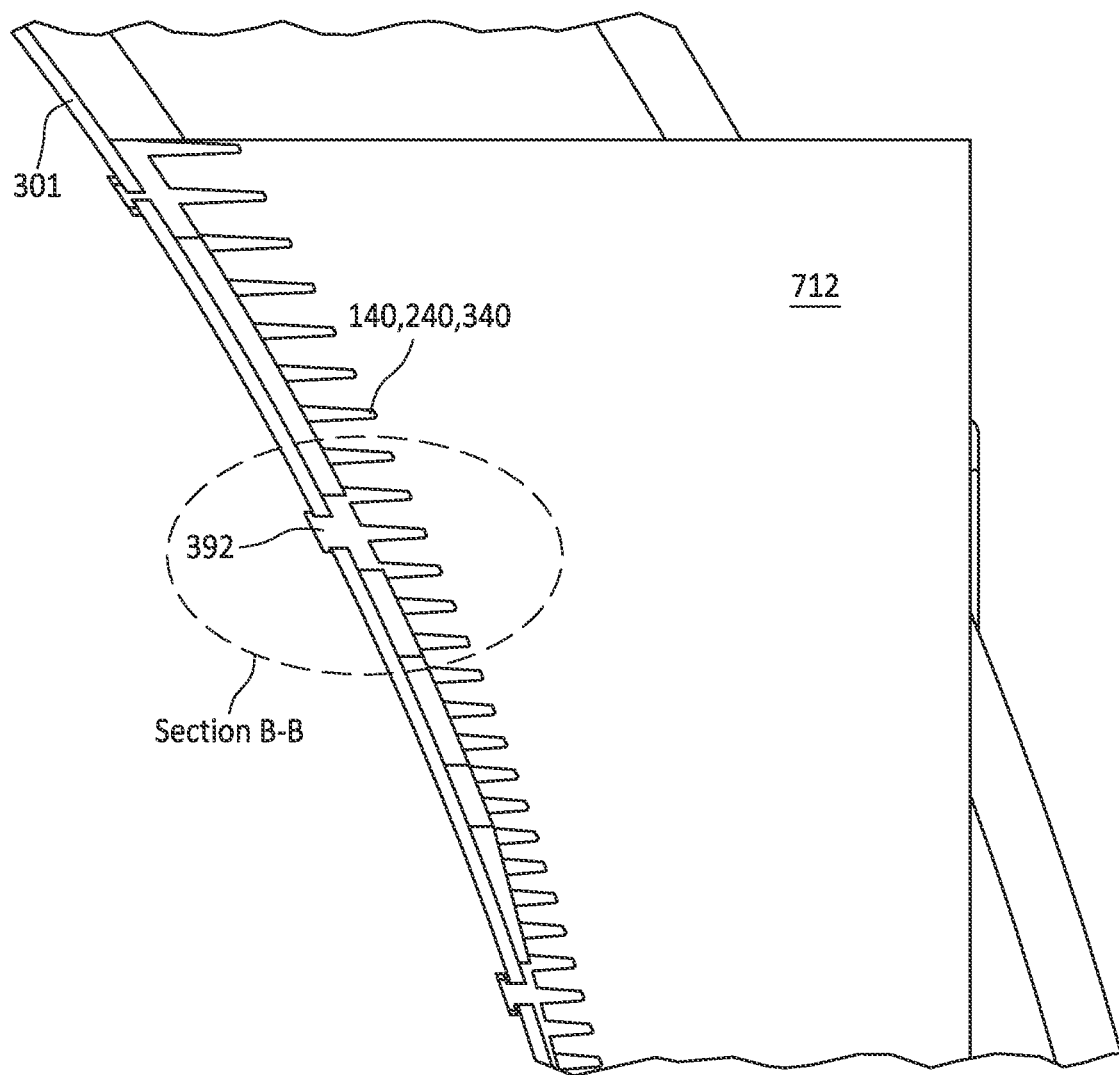
FIG. 36 shows a close up, sectional view of the second mold cavity of FIG. 35 showing the louver article formed by the PP and/or PE material, in accordance with one embodiment of the invention.
Figure 37:
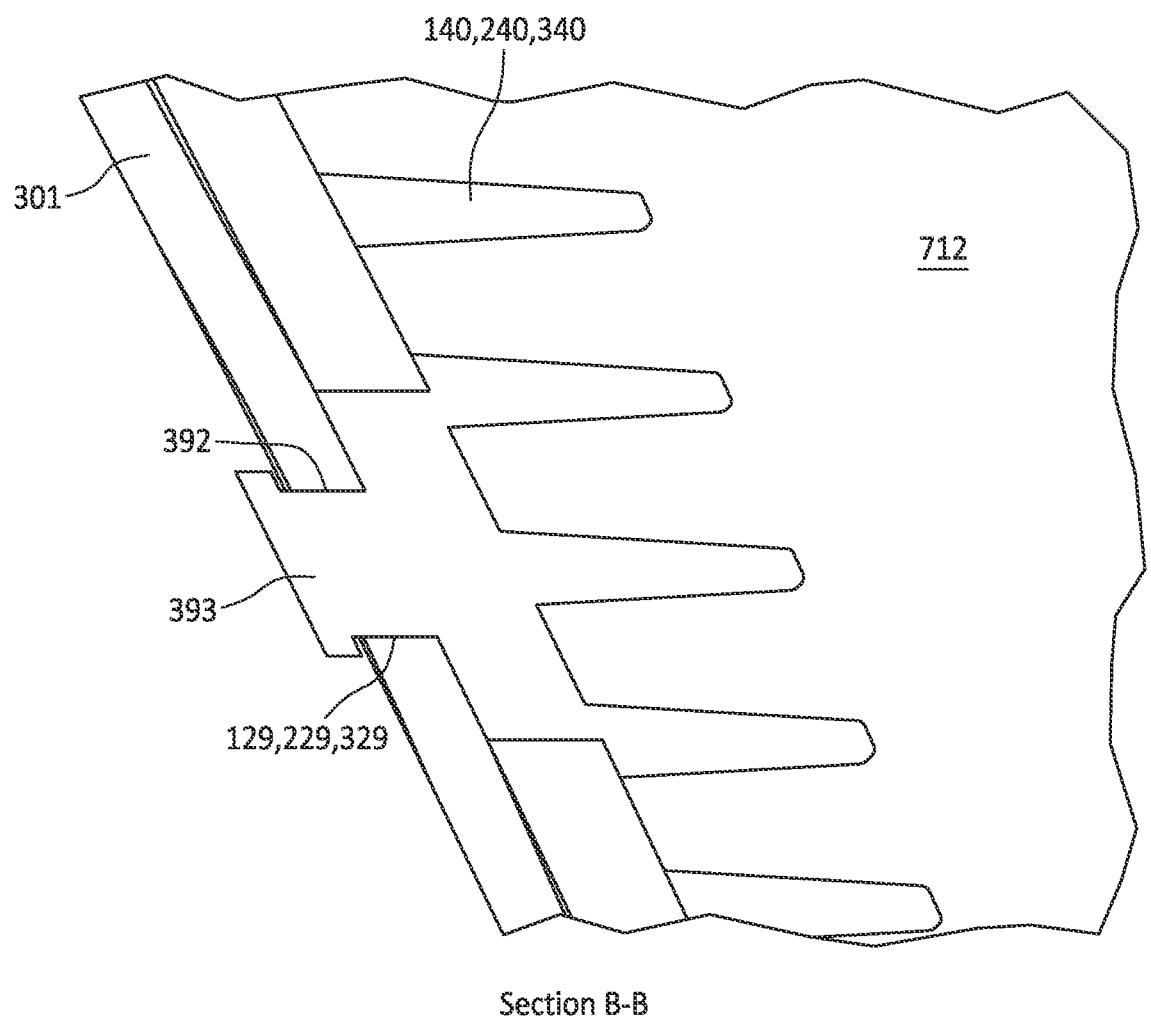
FIG. 37 shows a close up, sectional view of the second mold cavity of FIG. 35 showing the louver article formed by the PP and/or PE material, in accordance with one embodiment of the invention.
Figure 38:
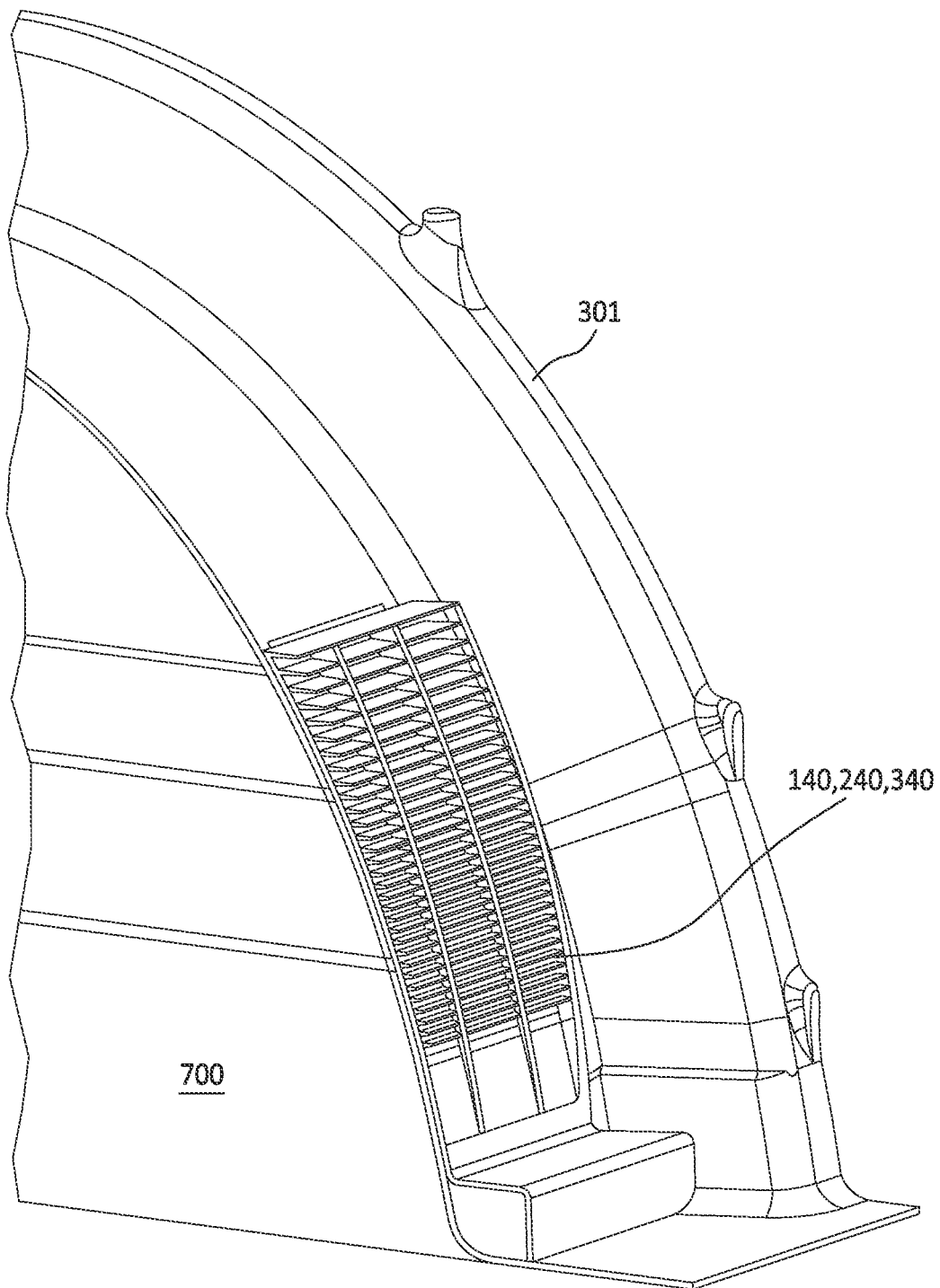
FIG. 38 is a side sectional view of a section of leaching chamber 300 with the louver article of FIG. 17 and the mold core associated therewith, in accordance with one embodiment of the invention.
Figure 39:
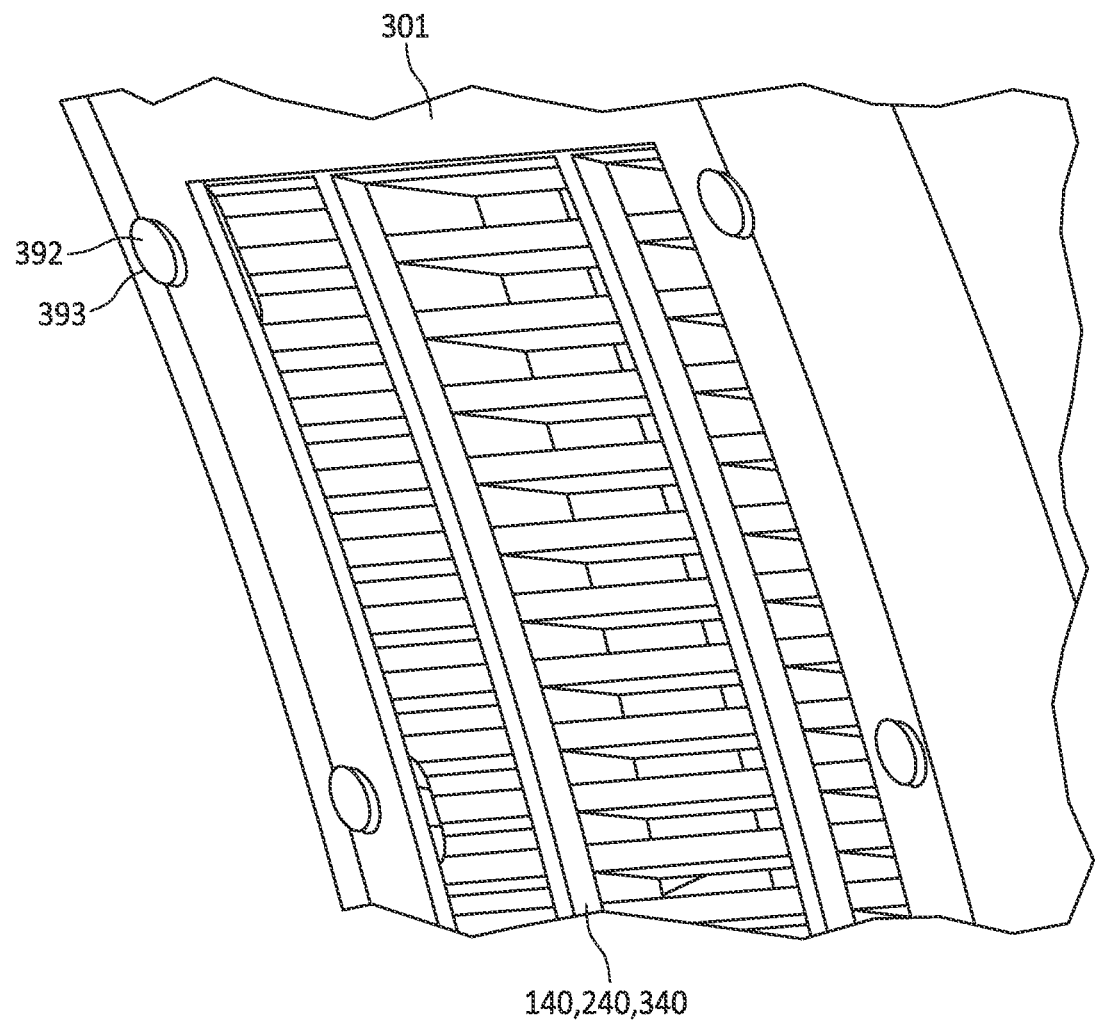
FIG. 39 is a close up of the inner side of the substrate and louver article showing the rear of the louver article, in accordance with one embodiment of the invention.
Figure 40:
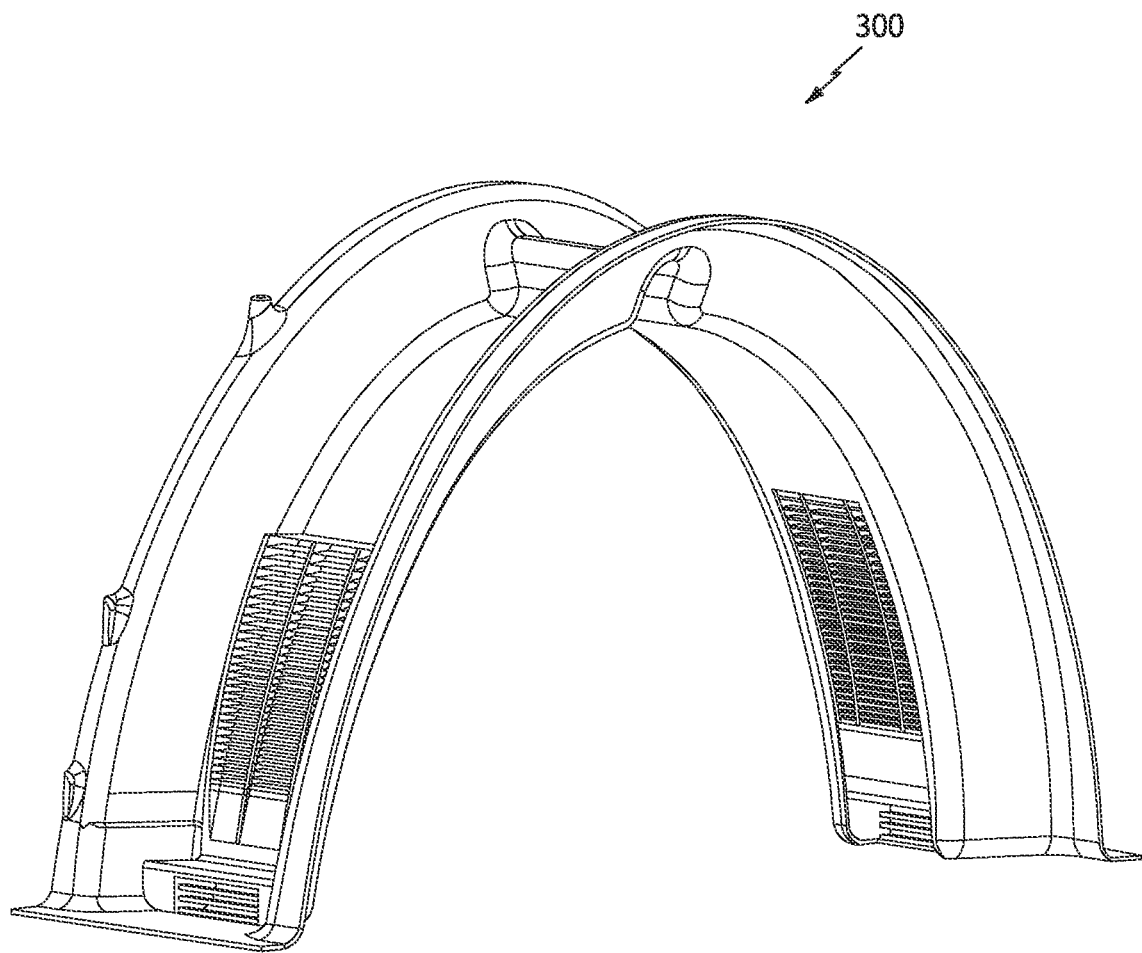
FIG. 40 shows a section of a leaching chamber having louver articles molded using the method of FIG. 29 with the mold core and first and second mold cavities of FIG. 29 and FIG. 34, respectively, in accordance with one embodiment of the invention.

Referring again to FIG. 34 and FIG. 35, once the first mold cavity 702 is disassociated from the mold core 700, a second mold cavity 712 is associated with the mold core 700. As with the first mold cavity 702, the second mold cavity 712 is configured to cooperate with the mold core 700 and fit together with the mold core 700 to be located proximate to and cover the leaching openings 130, 230, 330 and tab slots 129, 229, 329 such that a space 714 exists between the mold core 700 (which forms the inner surface of the louver article 140, 240, 340) and the second mold cavity 712 (which forms the outer surface of the louver article 140, 240, 340). A heated polyethylene (PE) and/or a polypropylene (PP) material is injected into the space 714 to create the louver article 140, 240, 340 and to over-mold the louver article 140, 240, 340 with the leaching chamber substrate 301, as shown in operational block 604. Referring to FIG. 36 and FIG. 37, when the heated polyethylene (PE) and/or a polypropylene (PP) material is injected into the space 714, the polyethylene (PE) and/or a polypropylene (PP) material flows into the tab slot cavities 129, 229, 329 to form the one or more tabs 392, wherein the tab head 393 is located proximate the inner surface of the substrate is in the chamber cavity 312. The tab head 393 is sized to be larger than the tab slot cavities 129, 229, 329 such that the tabs 392 cannot be removed from the tab slot cavities 129, 229, 329 and to securely anchor the louver article 140, 240, 340 to the substrate. Once the polyethylene (PE) and/or a polypropylene (PP) material is cooled, the second mold cavity 712 is disassociated from the mold core 700 and the leaching chamber 300 is removed from the injection molding machine.

Moreover, it should be appreciated that these methods 500, 600 may be accomplished via any molding process suitable to the desired end purpose. For example, one such molding process may include rotational molding using one (1) injection molding machine. Another molding process may include multiple injection molding machines, wherein the method may be accomplished via molding of the first molded article, i.e. the PET chamber substrate (or PP/PE substrate) 101, 201, 301 or the PP/PE (or PET) louver article 140, 240, 340, via a first injection molding machine and then transferring (via robotically or other suitable transfer method) the first molded article from the first injection molding machine to a second injection molding machine where the second molded article, is molded (i.e. for example, over-molding) with the first molded article to be securely associated with the first molded article.

In accordance with an exemplary embodiment, the method of the invention may be implemented through a controller operating in response to a computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing. Moreover, the method of the invention may be embodied in the form of a computer or controller implemented processes and apparatuses for practicing those processes. As such, the methods and embodiments described hereinabove and in the several figures may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention.

While the invention has been described with reference to an exemplary embodiment, it should be understood by those skilled in the art that various changes may be made and equivalents may be substituted for elements thereof without departing from the scope of the invention. Moreover, the embodiments or parts of the embodiments may be combined in whole or in part without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

We claim:

1. A corrugated plastic leaching chamber having an arch-shaped cross section, opposing side base flanges which lie in a horizontal plane and extend lengthwise along the chamber and opposing sidewalls extending upwardly from each of the opposing side base flanges to a top of the chamber, wherein the chamber includes a lengthwise center plane which is perpendicular to the horizontal plane, the chamber comprising:
a chamber substrate defining a chamber cavity and constructed from a Polyethylene terephthalate (PET) material and having,
a plurality of peak corrugations running transverse to the length of the chamber, wherein each of the plurality of peak corrugations includes a peak top;
a plurality of valley corrugations running transverse to the length of the chamber, wherein each of the plurality of valley corrugations includes a valley bottom,
wherein each of the peak tops are connected with an adjacent valley bottom via an arch-curving sidewall,
wherein each of the plurality of peak corrugations are located adjacent at least one of the plurality of valley corrugations such that the plurality of peak corrugations and the plurality of valley corrugations are alternating along the length of the chamber, and
wherein a plurality of at least one of the valley bottoms and peak tops define at least one leach opening, and
a plurality of louver articles, wherein each of the plurality of louver articles define a plurality of louver slot openings which are communicated with the chamber cavity, wherein each of the plurality of louver slot openings includes a slot opening height and a slot opening width and, wherein each of the plurality of louver articles are constructed from a rigid, Non-PET material and are securely associated with the chamber to cover one of the at least one leach opening.

2. The chamber of claim 1, wherein at least one of the plurality of louver articles is constructed from at least one of a Polyethylene (PE) and a Polypropylene (PP) material.

3. The chamber of claim 1, wherein the chamber substrate includes at least one tab slot opening located in at least one of the,
arch-curving sidewalls, and
the valley bottoms.

4. The chamber of claim 3, wherein the plurality of louver articles includes at least one tab, wherein the at least one tab is located proximate the leach opening and configured to securely associate with the at least one tab slot opening.

5. The chamber of claim 1, wherein the chamber substrate is formed using an injection molding process to include the plurality of leach openings and a plurality of tab slot openings, wherein each of the plurality of leach openings are located proximate a tab slot opening.

6. The chamber of claim 5, wherein the plurality of louver articles are formed using an injection molding process and is constructed from at least one of a Polyethylene (PE) and a Polypropylene (PP) material to include a plurality of tabs, wherein each of the plurality of tabs are located and configured to securely engage with one of the plurality of tab slot openings.

7. The chamber of claim 6, wherein each of the plurality of tabs are configured to be contained within a tab slot opening and frictionally engage with the chamber substrate.

8. The chamber of claim 5, wherein the plurality of louver articles are formed using an over-mold injection molding process and is constructed from at least one of a Polyethylene (PE) and a Polypropylene (PP) material to include a plurality of tabs, wherein each of the plurality of tabs are located within one of the plurality of tab slot openings.

9. The chamber of claim 8, wherein each of the plurality of tabs include a tab head which is larger in size than the tab slot opening to securely associate the plurality of louver articles with the chamber substrate.

10. A corrugated plastic leaching chamber, the chamber comprising:
a chamber substrate constructed from a Polyethylene terephthalate (PET) material and having opposing side base flanges which lie in a horizontal plane and extend lengthwise along the chamber substrate,
wherein the chamber substrate includes opposing sidewalls extending upwardly from each of the opposing side base flanges to a top of the chamber substrate, wherein the chamber substrate defines a chamber cavity and includes a lengthwise center plane which is perpendicular to the horizontal plane, and
wherein the opposing sidewalls define a plurality of leaching openings having at least one tab slot opening located proximate thereto, and a plurality of louver articles, wherein each of the plurality of louver articles define a plurality of louver slot openings which are communicated with the chamber cavity, wherein each of the plurality of louver articles are constructed from a structurally rigid, non-PET material and include at least one tab which is configured to engage with the at least one tab slot opening to securely associate the plurality of louver articles with the chamber substrate to cover the at least one leach opening.

11. The chamber of claim 10, wherein the opposing sidewalls include, a plurality of peak corrugations running transverse to the length of the chamber substrate, wherein each of the plurality of peak corrugations includes a peak top; and a plurality of valley corrugations running transverse to the length of the chamber substrate, wherein each of the plurality of valley corrugations includes a valley bottom, wherein each of the peak tops are connected with an adjacent valley bottom via an arch-curving sidewall, and wherein each of the plurality of peak corrugations are located adjacent at least one of the plurality of valley corrugations such that the plurality of peak corrugations and the plurality of valley corrugations are alternating along the length of the chamber substrate, and wherein a plurality of at least one of the valley bottoms and peak tops define the at least one leach opening.

12. The chamber of claim 11, wherein the at least one tab slot opening is located in at least one of the, arch-curving sidewalls, and the valley bottoms.

13. The chamber of claim 11, wherein the at least one leach opening includes a plurality of leach openings, the at least one tab includes a plurality of tabs, and the at least one tab slot opening includes a plurality of tab slot openings.

14. The chamber if claim 13, wherein the chamber substrate is formed using an injection molding process to include the plurality of leach openings and the plurality of tab slot openings, wherein each of the plurality of tab slot openings are located proximate at least one of the plurality of leach openings.

15. The chamber of claim 13, wherein the plurality of louver articles are formed using an injection molding process and is constructed from at least one of a Polyethylene (PE) and a Polypropylene (PP) material to include the plurality of tabs, wherein each of the plurality of tabs are located and configured to securely engage with one of the plurality of tab slot openings.

16. The chamber of claim 15, wherein each of the plurality of tabs are configured to be contained within one of the plurality of tab slot openings to frictionally engage with the chamber substrate.

17. The chamber of claim 15, wherein the plurality of louver articles are formed using an over-mold injection molding process and is constructed from at least one of a Polyethylene (PE) and a Polypropylene (PP) material to include the plurality of tabs, wherein each of the plurality of tabs are located within one of the plurality of tab slot openings.

18. The chamber of claim 17, wherein each of the plurality of tabs include a tab head which is larger in size than the tab slot opening to securely associate the plurality of louver articles with the chamber substrate.

19. The chamber of claim 10, wherein the plurality of louver articles are constructed from at least one of a Polyethylene (PE) and a Polypropylene (PP) material.

* * * * *